(12) United States Patent
Craig et al.

(10) Patent No.: US 11,574,363 B2
(45) Date of Patent: Feb. 7, 2023

(54) EVALUATING DATA USING ELIGIBILITY CRITERIA

(71) Applicant: CanDeal.ca Inc., Toronto (CA)

(72) Inventors: Andre Craig, East York (CA); Nicola von Schroeter, Toronto (CA); Derek Hwong, Richmond Hill (CA); Andre Langevin, Toronto (CA)

(73) Assignee: CanDeal Innovations Inc., Toronto (CA)

( * ) Notice: Subject to any disclaimer, the term of this patent is extended or adjusted under 35 U.S.C. 154(b) by 0 days.

(21) Appl. No.: 17/204,382

(22) Filed: Mar. 17, 2021

(65) Prior Publication Data

US 2021/0334902 A1    Oct. 28, 2021

Related U.S. Application Data

(60) Provisional application No. 63/014,612, filed on Apr. 23, 2020.

(51) Int. Cl.
| | |
|---|---|
| *G06F 16/23* | (2019.01) |
| *G06Q 40/06* | (2012.01) |
| *G06Q 30/00* | (2012.01) |
| *G06Q 50/26* | (2012.01) |

(52) U.S. Cl.
CPC ......... *G06Q 40/06* (2013.01); *G06F 16/2365* (2019.01); *G06Q 30/018* (2013.01); *G06Q 50/26* (2013.01)

(58) Field of Classification Search
CPC ............................ G06Q 40/06; G06F 16/2365
USPC ....................................................... 705/35–45
See application file for complete search history.

(56) References Cited

U.S. PATENT DOCUMENTS 8,433,645 B1 * 4/2013 Waelbroeck ........... G06Q 40/04
705/37

* cited by examiner

*Primary Examiner* — Robert R Niquette
(74) *Attorney, Agent, or Firm* — GTC Law Group PC & Affiliates

(57) ABSTRACT

Improved methods and systems are disclosed for processing data records. A method includes receiving data records from a plurality of sources for a plurality of submitters and adjusting the data records by adding fields to the records. The added fields may provide normalized data. The method may also include parsing the added fields to identify a data window within the data records with at least a threshold of data for a subset of the plurality of submitters, determining data statistics of the data for each submitter for the determined data window, and appending flags to the records according to the data statistics.

10 Claims, 21 Drawing Sheets

EVALUATING DATA USING ELIGIBILITY CRITERIA

CLAIM OF PRIORITY

This patent application claims the benefit of U.S. Patent Application Ser. No. 63/014,612, filed Apr. 23, 2020, and entitled "INTEGRATED METHODS AND SYSTEMS FOR INFORMATION PROCESSING FOR THE DERIVATION OF MARKET REFERENCE PRICES".

The content of the foregoing application is hereby incorporated by reference in its entirety for all purposes.

BACKGROUND

Field

The present application generally relates to evaluating data using eligibility criteria.

SUMMARY

The examples in this section are merely representative of some possible embodiments, but do not reflect all possible embodiments, combination of elements, or inventions disclosed in this application. In an example, a method for processing data records may include receiving data records from a plurality of sources for a plurality of submitters, adjusting the data records by adding fields to the records, wherein the added fields provide normalized data, parsing the added fields to identify a data window within the data records with at least a threshold of data for a subset of the plurality of submitters, determining data statistics of the data for each submitter for the determined data window, and appending flags to the records according to the data statistics. The method may further include determining a performance filtered composite (PFC) price based on the flagged records and/or determining eligibility criteria based on the data statistics for each data submitter. In some examples, the eligibility criteria may include a measure of price volatility for each submitter. The method may further include removing records associated with submitters that do not meet the eligibility criteria. In some examples, the method may further include determining, from the data records, a tracking error threshold based on the tracking error and the price volatility, and removing data records based on the tracking error threshold. In some examples, the data records include sell data and/or buy data. In some examples, the data window may correspond to a time span between two and five days. The method may further include displaying the data statistics for each submitter.

In another example, an apparatus may include a data window determining circuit that may be structured to interpret data to identify a time window with at least a threshold quantity of data for a set of submitters, a tracking error determining circuit that may be structured to determine a tracking error of the data in the time window for each of the submitters, a volatility benchmark circuit that may be structured to determine a volatility of the data in the time window, and a flagging circuit that may be structured to identify submitters with the tracking error and volatility benchmark larger than a tracking threshold. The apparatus may further include a price determining circuit structured to determine a performance filtered composite price based on the identified submitters. In some examples, the tracking error determining circuit may be further configured to determine eligibility criteria based on data statistics for each data submitter. In some examples, the eligibility criteria may include a measure of price volatility for each submitter. In some examples, the tracking error determining circuit may be further configured to remove data associated with submitters that do not meet the eligibility criteria. In some examples, the data may include sell data and/or buy data. In some examples, the data window may correspond to a time span between two and five days or a time span for at least four days. In some examples, the apparatus may further include a display circuit for displaying the data statistics for each submitter.

In another example, a method for deriving closing reference prices may include receiving data from one or more submitters, validating the data, determining eligibility of the validated data based at least in part on a set of eligibility criteria, filtering the validated data based at least in part on the set of eligibility criteria, determining a performance filtered composite (PFC) price based on the filtered data, wherein the PFC is computed as an average of the filtered data. In some examples, the set of eligibility criteria may include a measure of a tracking error of each data in a time window. In some examples, the set of eligibility criteria may include a measure of price volatility for each submitter. The method may further include determining a tracking error threshold based on the tracking error and the price volatility and filtering the validated data based on the tracking error threshold. In some examples the data may include sell data and the time window may be greater than five days. In some examples, the method may further include comparing tracking error for PFC price and the tracking error for price based on unfiltered data and displaying the comparison.

In another example, a non-transitory computer readable medium may include software instructions that, when executed by a processor, may cause the processor to perform a method. The method may include receiving data from one or more submitters, validating the data, determining eligibility of the validated data based at least in part on a set of eligibility criteria, filtering the validated data based at least in part on the set of eligibility criteria, and determining a performance filtered composite (PFC) price based on the filtered data, wherein the PFC is computed as an average of the filtered data. In some examples, the set of eligibility criteria may include a measure of a tracking error of each data in a time window and/or the set of eligibility criteria may include a measure of price volatility for each submitter. The method may also include determining a tracking error threshold based on the tracking error and the price volatility and filtering the validated data based on the tracking error threshold. In some examples the data may include sell data and/or the time window may be greater than five days. In some cases, the method may further include comparing tracking error for PFC price and tracking error for price based on unfiltered data and displaying the comparison.

In yet another example, a system for deriving closing reference prices may include a validation component for validating received data, a composite eligibility determination component for determining eligibility of the validated data based at least in part on a set of eligibility criteria, an eligibility filter component for filtering the validated data based at least in part on the set of eligibility criteria, and a composite calculation component for determining a performance filtered composite (PFC) price based on the filtered data. In some examples, the PFC may be computed as an average of the filtered quote data. In some examples, the set of eligibility criteria may include a measure of a tracking error of each data in a time window and/or the set of eligibility criteria may include a measure of price volatility for each submitter. In some examples, the composite eligibility determination component may be configured for determining a tracking error threshold based on the tracking error and the price volatility and filtering the validated data based on the tracking error threshold. In some examples, the data may include sell data and/or the time window may be greater than five days.

BRIEF DESCRIPTION OF THE DRAWINGS

The following detailed description and certain embodiments thereof may be understood by reference to the following figures.

Figure 1:
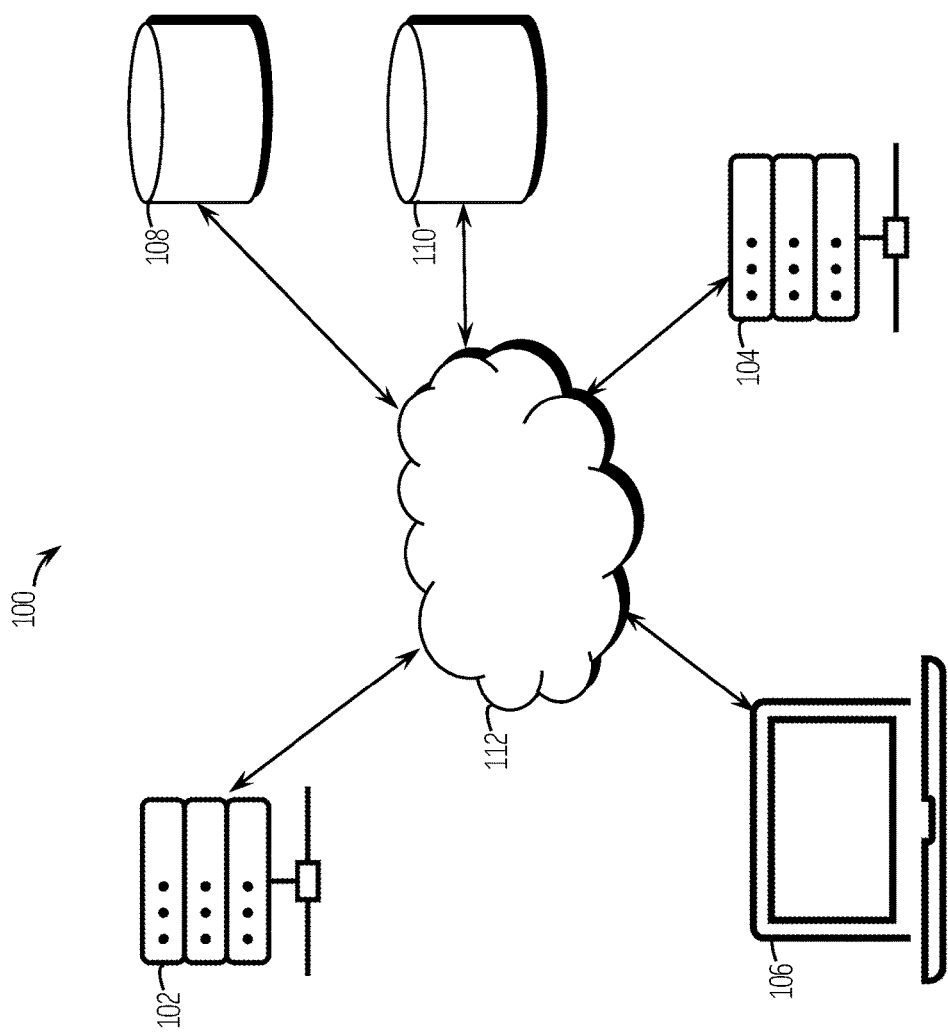
FIG. 1 depicts aspects of a system for determination of adaptive reference pricing.

While the present disclosure has been described in connection with certain preferred embodiments, other embodiments would be understood by one of ordinary skill in the art and are encompassed herein.

DETAILED DESCRIPTION

Methods and systems for determining over-the-counter (OTC) market closing reference prices are described herein. In embodiments, an OTC market is a decentralized market in which market participants trade directly without a central exchange or broker. OTC trading may be conducted electronically. The method (herein, also referred to as the "composite pricing method") and its information system processing design architecture include significant enhancements to the various methods and system design approaches that are currently available. The method and system may be applied in the local fixed income marketplace (such as the local Canadian fixed income marketplace). In embodiments, the innovations described herein may be applied to various OTC market structures such as the Canadian marketplace, US marketplace, international marketplace, local marketplace, regional marketplace, and the like, as well as across markets.

The methods and systems described herein are described in association with bond prices, but it is to be understood that the methods, systems, and concepts may be applied to market closing and other pricing of other securities, commodities, financial products, currencies, and cryptocurrencies. In embodiments, the methods, systems, and concepts described herein may be applied to market closing and other pricing of over-the-counter traded bonds, securities, commodities, financial products, currencies, cryptocurrencies, and the like.

The methods and systems described herein provide for and promote enhanced market transparency and improved governance and/or oversight over the business of administrating fixed income benchmark indices (such as Canada's fixed income benchmark indices).

In some embodiments, the methods and systems described herein may be used by a benchmark administrator which has the responsibility for the calculation of a financial benchmark (e.g., a credit index) such as the Financial Times Stock Exchange (FTSE) or any other such benchmark administrator. In some embodiments, the benchmark administrator may use the systems and methods described herein to improve the way input prices are collected, aggregated, calculated, and published. In some embodiments, the systems and methods described herein may be used to improve the input, closing, or other prices of the universe of securities contained in indices are collected, aggregated, calculated and published.

Some aspects of the enhancements of the proposed methods and systems over traditional methods for the closing market price calculation methods include:

1. The content being submitted;
2. Submitter accountability for the quality of prices;
3. Enhanced use of regulatory-reported trade data;
4. More comprehensive data validation algorithms;
5. Multiple approaches in calculation methodologies; and
6. Automation of the information system processing functions.

In the area of content, the systems and methods described herein provide for improved data reliability and confidence by defining guidelines and rules for file submission schemas, defining a certification process for dealers, determining trade flows, and evaluating quote data with respect to market-making activity, institution size, spread, and the like. In contrast, existing methods lack data transparency and may not reflect relevant data related to trade flows, inventory, spread data, and the like.

In the area of submitter accountability, the systems and methods described herein provide for improved data quality reporting with consistent supervision. In contrast, existing methods lack incentives to maintain quality standards and are not conducive to supervision.

In the area of use of trade data, the systems and methods described herein provide for improved data sourcing by incorporating more relevant data from more data sources. In contrast, existing methods are limited in their data ingestion capabilities, rely on limited data and may not be able to evaluate and filter for high-quality data.

In the area of use of data validation, the systems and methods described herein provide for improved data validity and consistency checks with multiple levels of error checking and error checking with respect to historical perspectives and/or trends. In contrast, existing methods are limited and provide limited manual spot-checking of data and use basic statistical methods to validate data.

In the area of automation, the systems and methods described herein may be fully automated, while existing approaches are not fully automated and require human intervention. Traditional approaches require human intervention. The systems and methods described herein reduce the complexity of operations to facilitate automation.

Current methods and systems are limited and result in material discrepancies in valuations of fixed income securities, which undermine the viability of investing in these kinds of securities and present a barrier to entry and growth to the investment asset class in Canada and internationally. The systems and methods described herein provide for various enhancements and improvements over prior methods and improve the viability of investing in securities.

Certain descriptions herein include dealer quote submissions. Dealer quote submissions, as used herein, should be understood broadly. In embodiments, an entity may collect two-sided and single-quoted prices that are reflective of institutional size market-making activity from a pool of dealers (such as, for example, the primary 6 Canadian dealers). Two-sided quotations consist of the simultaneous bid and offer prices being quoted in the marketplace. Single dealer quotations represent the price at which a buy or sell order will be offered to an institutional client. The system source for these quotations may be a securities dealer's primary front-office pricing systems.

4 pm reference pricing, as used herein, should be understood broadly. In embodiments, 4 pm reference pricing may include methods used to validate and calculate a composite price from submitted two-sided and single dealer quotes, which is usually anchored in observable transaction data. In the event that composite prices cannot be produced, the methods may be supplemented with alternative calculations that still produce valid prices.

Fair value measurement, as used herein, should be understood broadly. In embodiments, asset valuation practices generally must measure and report investments in their financial statements at fair value in accordance with established accounting methods such as the FASB ASC 820, Fair Value Measurement. A fair-value accounting method is a method adopted for the evaluation of assets at present, actual, or market value. Accurate and independently validated quote pricing at the end of a market trading day can be used as inputs to the market value calculation.

Regulatory organizations, as described herein, should be understood broadly and may include organizations in any jurisdiction and may include Investment Industry Regulatory Organization of Canada (IIROC), Financial Industry Regulatory Authority (FINRA), and the like.

Certain descriptions herein include a reference to IIROC Rule 2800-C Canadian Debt Securities Trade Data Reporting. This regulatory rule requires that IIROC dealer members report information about each of their transactions in Canadian Debt Securities to IIROC in the prescribed file format. In embodiments, some of the trade data being generated as inputs to the proposed method and information system processes conform to some of those also submitted to IIROC. In some embodiments, trade data may include one or more data reported to or maintained by other regulatory and other organizations and may be sourced from submitters, dealers, regulators, or other parties.

Observability, as described herein, should be understood broadly. In some embodiments, observability may be consistent with the financial accounting standards board (FASB) definition of observability. In some embodiments, observable inputs are inputs that reflect assumptions market participants would use in pricing the asset or liability developed based on market data obtained from sources independent of the reporting entity.

The fallback composite calculation, as described herein, should be understood broadly. In some embodiments, a fallback composite calculation may include a series of other calculations required when the performance-filtered composite price calculation cannot be published and/or computed such as for example due to insufficient trading activity.

The performance-filtered composite price, as described herein, should be understood broadly. In some embodiments, it may be based on methods used to validate closing market quote prices against trades which dealers report to regulatory organizations.

Tracking error, as described herein, should be understood broadly. In some embodiments, it may be based on a statistical method of quantitatively measuring concordance of a price series with the trade history from an aggregate set of dealer trade reports.

Trade data feed, as described herein, should be understood broadly. In some embodiments, it may include a mechanism in which dealers deliver financial data such as trade records in a file that can be accessed from a secure site automatically.

In many instances, submitted end of day price quotes for fixed income securities that have not actively traded need further validation using trade data in order for users to assign appropriate relevance to the data. As such, methods based on simple averaging of quote data, the most often used in existing methods, may not be a good enough quantitative measure of the "goodness" of the resulting price.

The implication is that the practice of publishing composite prices, in the absence of them being systematically and technologically anchored in a fully automated and complete daily trading publication activity, can lead to end of day securities valuation discrepancies that may be material in nature.

In embodiments, methods and systems described herein source various datasets and ensure the data itself is derived using a transparent methodology that takes all trading data into account while producing end output in a manufacturing environment that is completely electronic and quality-controlled using industry best practices.

Turning to FIG. 1, embodiments of the current disclosure may provide for determination of adaptive reference pricing. As will be understood, embodiments of the current disclosure evaluate reference pricing according to submitted bids and quotes. The reference pricing may further be determined by filtering bids and/or quotes based on eligibility of submitters.

Accordingly, an embodiment system 100 for determining reference pricing is shown. The system 100 may further include an electronic device 106, one or more remote servers 102, 104, and/or a databases 108, 110 which may be in electronic communication with the servers 102, 104 and/or each other via a network 112. The one or more servers 102, 104 may form part of and/or host one or more of the platforms (further described with respect to FIG. 2).

The servers 102, 104 may be structured to execute a process forming part of a reference price determination. As will be understood, reference price determination is an analysis of trade data (quotes, bids, etc.) and evaluation of eligibility and error analysis. During the reference price determination process, the servers 102, 104 may access data from the databases 108, 110, validate the data, perform calculations, publish data, monitor data and price performance/error, and the like.

The electronic device 106 may be a user device, such as a desktop, laptop, smart device, etc. In embodiments, the electronic device 106 may provide for and/or present an interactive interface, that presents a plurality of prompts to a user for configuring, analyzing, and determining reference pricing. The databases 108, 110 may store data related to an active market (such as bids, quotes). In embodiments, the databases 108, 110 may store the data in a raw format such as time sampled activity of a market. Embodiments of the servers 102, 104 may access the databases 108, 110 to retrieve and/or store pricing data. Access to the databases may be in batch mode (such as end of day (EOD) access), event based (database may push data to the servers when new data is received) or on a continuous basis. The remote servers 102, 104 may form part of a collection of computation resources which can be accessed to distribute processing tasks.

Figure 2:
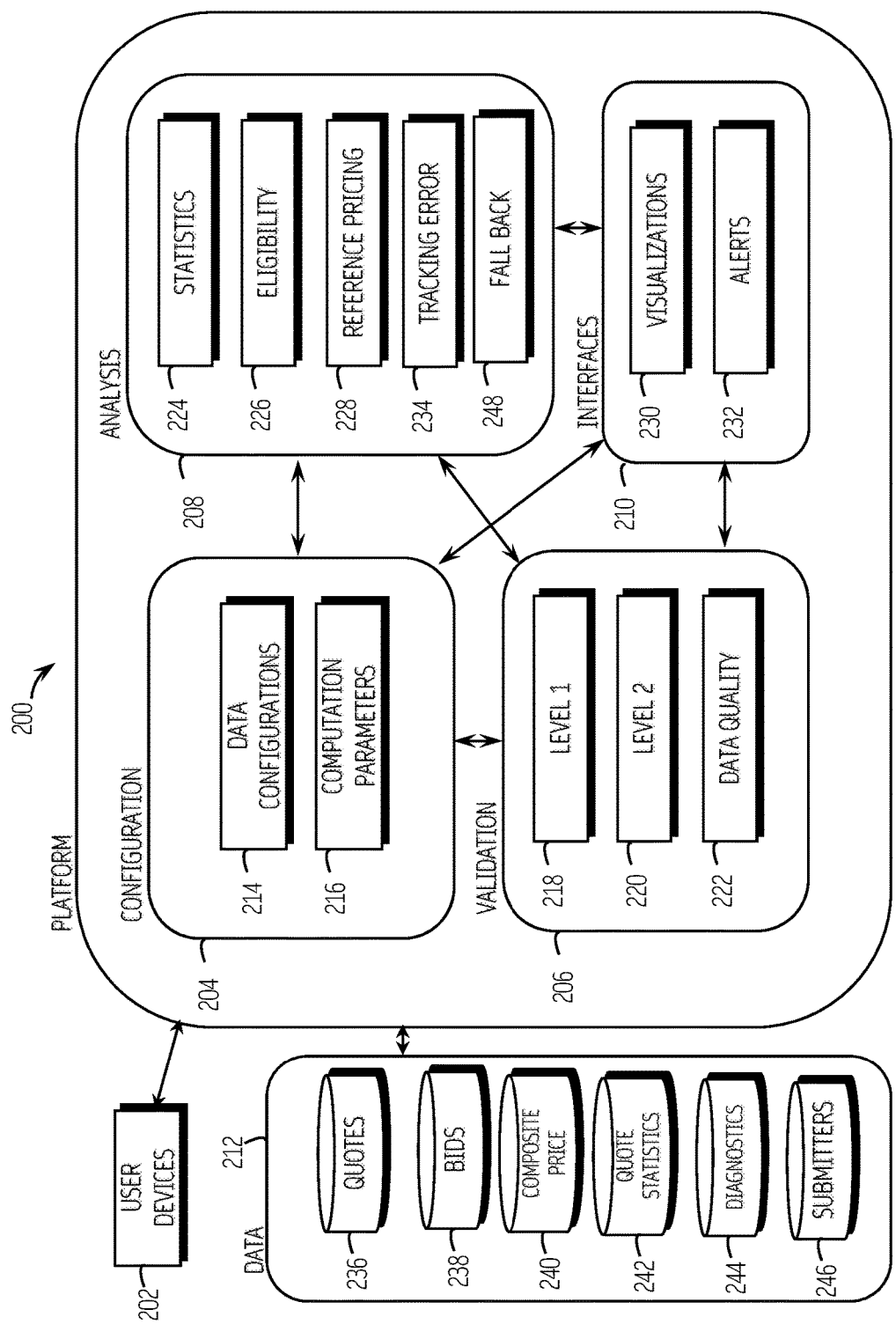
FIG. 2 is block diagram of a platform for analysis and derivation of market prices, in accordance with an embodiment of the current disclosure.

FIG. 2 shows an embodiment of a platform for analysis and derivation of market prices. The platform may be implemented in one or more of the servers 102, 104 from FIG. 1. The platform 200 may provide for a system for providing users with facilities and methods for analyzing, configuring, validating, and determining reference pricing. The facilities described herein may be deployed in part or in whole through a machine that executes computer software, modules, program codes, and/or instructions on one or more processors, as described herein, which may be part of or external to the platform 200.

A user may interact with the platform 200 through one or more user devices 202 (e.g., computer, laptop computer, mobile computing device, and the like). The platform 200 may be implemented and/or leverage one or more computing resources such as a cloud computing service, servers, and the like. The platform 200 may be centrally hosted (e.g., accessed by users using a client (for example, a thin client) via a web browser or other application, accessed through or by mobile devices, and the like). The platform may be distributed among various computers, servers, and other resources. In embodiments, elements of the platform 200 may be implemented to operate on various platforms and operating systems. In embodiments, interfaces for the user device 202 through which the users may interact with the platform may be served to the user device 202 through a webpage, an application, a service, and the like.

The platform 200 may include one or more facilities such as a configuration facility 204, validation facility 206, analysis facility 208, interfaces facility 210, and data facility 212.

The configuration facility 204 may include configuration elements, questioners, and the like for specifying data configurations 214 (data sources, frequency of data collection, data input format, data output formats, types of validations for data, when data becomes stale, and the like). The configuration facility 204 may include configuration elements, questioners, and the like for specifying computation parameters 216 (data windows, fall back procedures, and the like as further detailed herein). The configuration facility 204 may determine configurations and/or parameters based on used input. The configuration facility 204 may determine configurations and/or parameters automatically or semi-automatically without user input based on received data 212 and trends, quality, or other parameters of the data (for example, such as trends in quotes 236, bids 238, submitters 246, and the like). Eligibility may be a function of trade volumes and prices. Eligibility refers to whether the prices are suitable to be included in the calculation.

The validation facility 206 may be configured to analyze input and output data 212 and validate the quality of inputs and outputs of the platform. The validation facility 206 may include a components for performing various levels of data validation (such as level 1 218 and/or level 2 220 validations). The validation facility 206 may further include a data quality component 222 for monitoring quality of data inputs and data outputs.

The analysis facility 208 of the platform 200 may, based on the configurations and parameters from the configuration facility 204, determine statistics for bids 238 and/or quote 236 data, determine eligibility for submitters 246, and/or determine reference pricing such as a composite price 240. The analysis facility 208 may include a statistics module 224 for determining aspects of trends and parameters of quotes 236 and bids 238 data. The analysis facility 208 may include an eligibility module 226 for determining eligibility of submitters 246. As further described herein, submitters 246 and their respective quotes 236 and/or bids 238 may be flagged as eligible or ineligible by the module 226. The analysis facility 208 may include a reference pricing module 228 for determining reference pricing based, at least in part, on the determined eligibility determinations of the eligibility module 226. The analysis facility 208 may include a tracking error module 234 for determining a tracking error as described herein as well as a fall back module 248 for determining fallback pricing.

The interfaces facility 210 may be include a visualizations module 230 to provide visualizations and interfaces for viewing results from analysis facility, data 212, validation facility 206, and/or configurations facility 204. The interfaces facility 210 may further include an alerts module 232 for providing notifications and/or alerts regarding outputs from tracking error module 234 (such as when tracking error is above or below a threshold), when a fall back module 248 is invoked, when reference pricing of the reference module 228 is below or above a threshold price, and the like.

In embodiments, the methods and systems described herein may include one or more calculations described herein. In the descriptions herein, the methods and systems are described as having four components. In some embodiments, the four components may correspond to one or more of the modules of the analysis facility 208 of the platform 200. In some embodiments, the four components may be divided or combined (or certain of them omitted), resulting in more or less than four components. For the example embodiments, the descriptions herein the four components to the methods and systems may include:

1 The Performance Filtered Composite Price ("PFC") calculation;

2 The selection of trades used for validation;

3 The Tracking Error ("TE") calculation; and

4 The Fallback Composite calculation ("FC").

In some embodiments, the reference pricing module 228 may be used for the performance filtered composite price calculation, the eligibility module 226 may be used for the selection of trades used for validation, the tracking error module 234 may be used for the tracking error calculation, and the fall back module 248 may be used for the fallback composite calculation. Some details and aspects of the four components are further described herein.

1 The Performance Filtered Composite Price ("PFC") calculation

In embodiments, the PFC calculation method uses trade history for a given security to identify and reject price submitters that do a poor job (relative to other submitters) at submitting quotes that are aligned with traded prices (i.e., has a poor track record). In embodiments, the PFC calculation method may further use trade history for a given security to calculate a "composite" price that is a simple average of the accepted submitters' prices.

For example, a security where four submitters submit prices that are not aligned with traded prices for a security, but where they are all consistent with each other will result in a PFC price with a large tracking error. The hypothesis is that the tracking error should scale roughly as the price volatility of a security so that it can be used as a benchmark to determine whether the PFC price is reasonable or not. In embodiments, the hypothesis may be verified using numerical methods and empirical data. In embodiments, when the difference between the prices is a fraction of the price volatility over a single business day, the PFC price may be considered reasonable.

In one instance, there may be securities for which there is not enough (sufficient) trade history to calculate a price, but for which there is reasonable confidence in a price. For example, a security for which there are no trades, but a reasonable quality benchmark exists, or a single issuer curve can be constructed from other validated security prices. In some embodiments, another price called an evaluated price may be derived to support this scenario.

In another instance, a security that typically has a PFC price, but on a given day, the submissions do not support it, however using e.g., yesterday's spread used against today's curve or benchmark security would likely lead to a sufficiently high-quality price. In embodiments, another price called a fallback composite ("FC") price may be derived to support this scenario.

In another instance, there may be an insufficient number of available trades for single security pricing, but the submitted quotes may be determined to be sufficient to result in reasonable prices. In embodiments, a fallback composite ("FC") price may be derived to support this scenario and the systems and methods described herein may be used to validate and assess the quotes.

In another instance, calculating the PFC may involve taking all of the above into account. Some requirements for the calculation are described herein.

1.1 Sourcing the Data

In embodiments, submitted trade records may be analyzed, filtered, and preprocessed. In some embodiments, trade history is collected. In some embodiments, trade history may be extracted from one or more trade data feeds. In some embodiments, preprocessing of trade data may include adjusting and/or filtering, as described herein.

In some embodiments, preprocessing data may include adjusting prices for commissions. In one example, trade data may be analyzed to determine if a commission in a trade file is likely. Based on the analysis, the commission price may be factored out of the price (in the case of a buy) or factored into the price (in the case of a sell). In one embodiment, the commission may be factored out of the price to produce an adjusted price.

In one embodiment, the commission may be factored into the price to produce an adjusted price. In embodiments, adjustments may include calculations to factor in or factor out a commission and/or other fees, taxes, and the like. In some embodiments, price adjustments may be based on a type of commission. In some cases, commissions may include flat-rate commission and may not depend on the quantity, percentage-based commissions that depend on a quantity of trades or the overall transaction value. The calculations described herein may be adjusted according to the type of commissions, tax, fee, and the like.

In embodiments, sourced data may include trade statistics. Trade statistics may be based on data sourced from trade data. The data may involve the calculation of the volume-weighted average buy and sell price (VWAP_buy and VWAP_sell, respectively) for the day. On days where the security does not trade, these statistics may have a value of zero or null. The volume-weighted average may be computed based on the adjusted date for the trade, not the execution date. Statistics may further include statistics for the number of trades in the (adjusted) day (Tradecount).

In embodiments, processing of submitted security price quotes may be subject to one or more of analysis and/or data cleaning algorithms. In one embodiment, the data analysis and/or cleaning algorithms may be applied at three different levels: Level 0, 1, and 2. In embodiments, data may be processed sequentially by each of the three levels. In embodiments, each level may include a set of cleaning algorithms, operation, validation checks and rules, and the like. In some embodiments, the processing may be performed in any order with respect to the levels. In some embodiments, only one level or a subset of rules, algorithms, and operations associated with each level may be performed. In some embodiments, selection of the number of levels of processing, the subset of rules or algorithms used to process data and the like may be based on timing constraints, source of the data, the format of the data, relationship status of the entity from which the source was received, and the like.

In embodiments, when data is analyzed at each of the levels, an output after processing at each level may include an identifier if the processed data was successfully analyzed and/or if the data successfully passed the cleaning algorithms, operations, validation checks and rules, and the like associated with each level. When data is identified as having failed to pass the associated cleaning algorithms, operations, validation checks and rules, and the like additional actions may be taken to remedy any data errors or processing issues. For example, if data is identified as failing to pass level 0, the check may be escalated and marked for remediation by a user such as a Tech Ops user. If data is identified as failing to pass level 1, the check may be escalated and marked for remediation by a user such as a Data Ops user. If data is identified as failing to pass level 2, the check may be escalated and marked for remediation by a user such as a Data Ops user. In some cases, some failures of validations may be considered non-critical, and the data may be passed for further processing despite some of the failures. In some embodiments, validation failures associated with level 1 may be considered non-critical.

A summary of aspects of the cleaning algorithms, operations, validation checks and rules, and the like associated with each level are provided herein.

Level 0: The file is complete and is received in a timely manner. These validations may be performed on the raw inbound data, an error at this level may result in the data not being available for downstream consumption. Checks at this level may ensure the file itself is complete and can be processed. In embodiments, checks and actions may include one or more of timing of file delivery, monitoring the arrival of the file, creating alerts when the file is late, storage size of the file, measuring and defining the expected file size, defining a threshold for tolerance, creating alerts when the file size is outside tolerance threshold, expected file size would be defined based on a sample size of actual files, the record count of the file, measuring and defining the expected record count within the file, defining a threshold for tolerance, creating alerts when the amount of records in the file is outside the tolerance threshold, record count would be defined based on a sample of actual files, the number of columns in the file, measuring and defining the expected number of deliminators in the file, creating alerts when the number of deliminators in the file does not match the expected amount, number of columns would be defined based on the number of field delimiters in actual files and the like.

Level 1: The contents of fields follow expected formats. These validations are performed on the raw inbound data, an error at this level may result in the data not being available for downstream consumption. Checks at this level may ensure the field contents follow expected formats. In embodiments, validations may include one or more of: a validation to ensure mandatory fields contain data, a validation to ensure fields with defined length contain data that matches that length, a validation to ensure fields with defined data type conform to that data type (i.e., dates, dollar values, etc.). In embodiments, checks at this level may include one or more of: a check of the security identifier, a check of one or more digits of security identifiers and the like. In embodiments, only data records with valid identifiers may be processed. In embodiments, checks may include a validation to ensure that the market date (maturity) of the instrument is on or after the ingestion date, and only prices for securities that are not matured may be ingested. In embodiments, level 1 checks may include a check for a locked market, which may be identified by bid prices being equal to ask prices. In embodiments, prices that correspond to a locked market may not be ingested. In embodiments, checks may include a check for a no price condition, which may be identified by bid prices and ask prices being equal to zero. In embodiments, prices that correspond to no price may not be ingested. In embodiments, checks may include a check for negative yield conditions, which may be identified by bid or ask prices being less than or equal to zero. In embodiments, prices that correspond to negative yields may be rejected or ignored.

Level 2: The contents of the fields conform to logical relationships. These validations are performed on data that has passed L0 and L1 validations. The L2 validations are purpose specific, this means the data is tagged with having an error but remains in the system and could be consumed for other purposes. Checks at this level may ensure the price and yield records within the dealer quotes conform to logical relationships. A record can fail more than one test.

One or more validations may cause a warning, while other validations may cause an error event. In embodiments, validation and data checks may include one or more of: security checks, yield change, Dixons Q tests, locked market tests, stale data tests, and the like.

Figure 3:
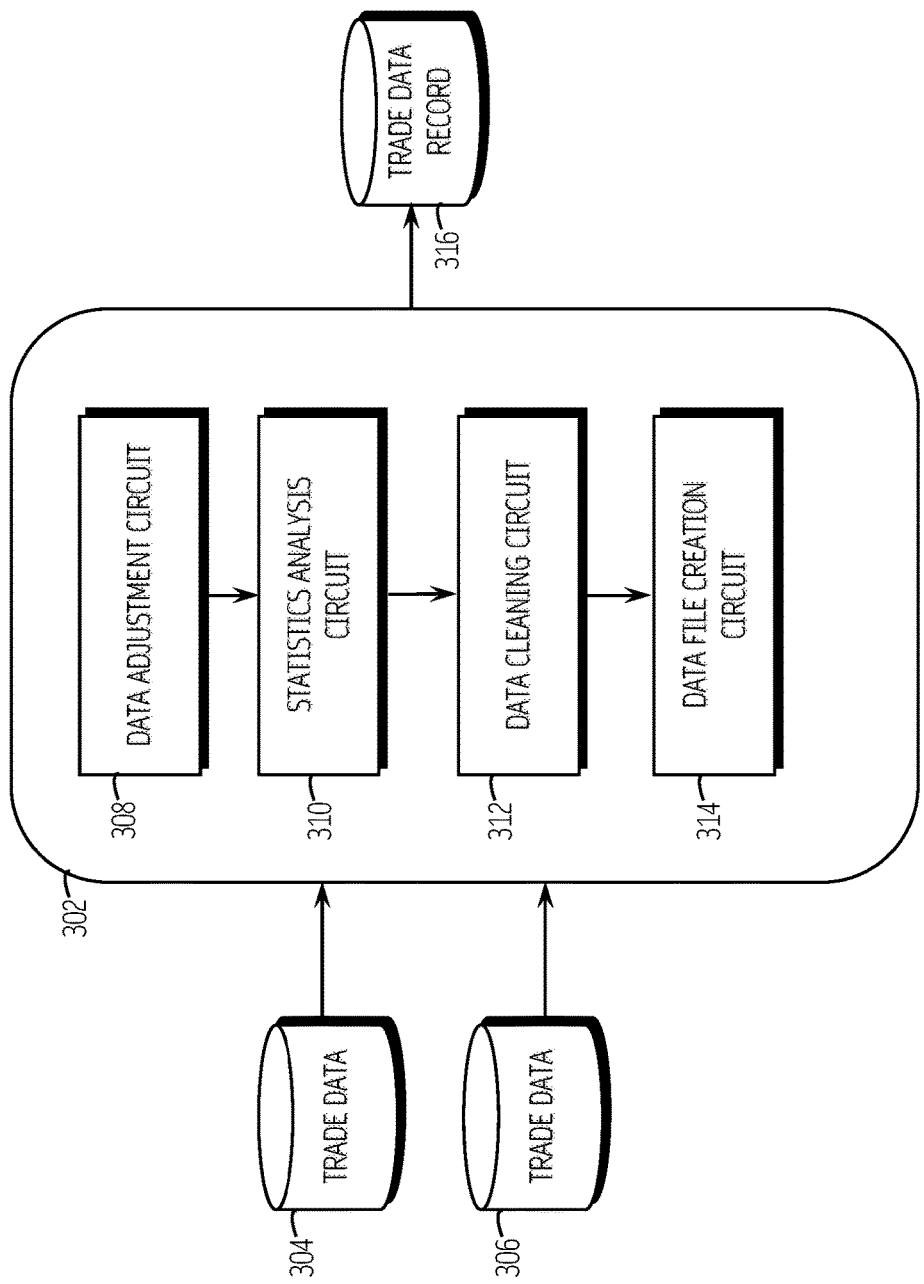
FIG. 3 depicts aspects of an apparatus for sourcing and validating trade data.

FIG. 3 shows aspects of an apparatus 302 for sourcing and validating trade data. The apparatus may include and/or perform functions of one or more facilities of the platform 200. For example, the apparatus may perform functions of the validation facility 206 and analysis facility 208.

In embodiments, the apparatus 302 may receive data from local or remote sources such as databases 304, 306. The data may be received using one or more application programming interfaces (APIs) for the data sources. In some cases, the data sources 304, 306 may be confidential and/or may require authorization for access. The data may be obtained from various sources and may include various formats, details, assumptions and the like. For example, in one source, trade data such as quote data may include a time stamp associated with the quote data while in another source, quote data may not include time stamps with every quote but only include periodic time stamps such as every minute or hour. In another example, some trade date may itemize elements such as commissions, taxes, and the like while other data sources may provide one combined price associated with trade data.

The apparatus may include a data adjustment circuit 808 that is structured to analyze the received trade data to determine if the data should be adjusted to make data sources comparable. Adjustments may include adjusting the price and time stamp in the trade data. Data adjustment circuit 808 may reference one or more adjustment tables for determining adjustments to data. The data records may be expanded to include a field (such as a column, extra data record, and the like) with the adjusted data. The adjusted data may be associated or the original data in a record. The apparatus may further include a statistics analysis circuit 310. The circuit 310 may compute one or more statistics of the received data and may include average, median, standard deviation, and the like. In some cases the analysis circuit 310 may identify outliers in the data. The analysis circuit 310 may mark statistically different trade data by appending a flag to the data record. The apparatus may further include a data cleaning circuit 312. The data cleaning circuit 312 may further apply additional rules and filters based on the various levels of validation (Level 0, Level 1, Level 2) described herein. In some cases, the different levels may be applied based on a user configuration or based on the results of the statistical analysis circuit 310. For example, data with number of data points that are outside of the expected values above a threshold may be configured to be processed with all the levels of validation while consistent data may only be processed with Level 0 validation. The data file creation circuit 314 of the apparatus 302 may be configured to combine the data files into one sequential trade data record file 316.

1.2 Assigning Eligibility Flags (PFC Eligibility)

In embodiments the quality of quotes submitted by each party may be assessed against a recent history of traded prices, and each submitter may be assigned an eligibility flag. In embodiments, an eligibility flag may be assigned as true when there is good agreement between quotes submitted by the submitter and a recent history of trades prices, and false otherwise. The amount of historical trading activity used for this purpose may depend on the frequency of trading. In embodiments, when the frequency of trading is high, as little as five or fewer days of historical trading activity may be used for this purpose. When the frequency of trading is low, as much as three months or more of historical trading activity may be used for this purpose. The amount of historical trading activity used may be a balance between responsivity and statistical significance of the estimated eligibility. In embodiments, eligible submitters may be submitters that have low tracking error between submitted quotes and traded prices within the historical period chosen. The threshold may be determined based on a combination of the performance of the overall sample of submitters and an estimate or the price volatility of the security, with some scaling factors that are adjusted to optimize the performance of the algorithm.

Aspects of an example method of assigning eligibility flags to submitters is outlined below.

In embodiments, eligibility flags that indicate which submitters prices are used in the PFC calculation may be determined.

In embodiments, the approach results in dropping certain data from consideration in determining the composite price.

In some embodiments, reduction of data may simplify computations and the needed computing resources.

In one embodiment, the eligibility flags may be determined based on one or more of the following steps:

1. For every day in history, source the bid and ask quotes from each bank: $Q_i^{bid}$ and $Q_i^{ask}$. On every day in history treat and process separately for bid and ask.

2. Find the shortest window subject to a floor of 1 week (5 business days) and a cap of 3 months (63 business days) for which 3 or more submitters provide quotes on 5 or more days on which there is a trade. If this is not possible then all submitters are assigned eligible=False. The maximum window size of 3 months may be chosen as a reasonably maximum timescale on which performance could be measured, essentially assuming that pricing of less liquid (i.e., less frequently traded) securities is likely to be reviewed at least quarterly by the submitters, so comparing performance over longer horizons is less meaningful. In some embodiments, the 3-month timescale may be shortened or extended based factors such as liquidity. This typically just finds the shortest window covering 5 days on which the security was traded, but the extra conditions avoid cases where there are gaps in the quote history due to bad data removal or other submission issues.

Using 5 days of quotes and trades is designed to have sufficient history that a meaningful tracking error can be calculated, but short enough to respond to changes reasonably rapidly. In some cases, submitters with as few as 3 days may be allowed, as described in the following steps. In embodiments, the requirement of 3 or more submitters provides a guarantee that there are at least 3 candidates to produce a composite from. In some embodiments, the requirement of the number of submitters may be higher such as 5 or more or 10 or more, and may be based on market aspects such as the number of traders, liquidity, and the like.

3. Any submitter that provides a quote on less than 3 days where there was a trade is assigned eligible=False, all others eligible=True. This condition may be viewed as a 'consistently quoting' condition, or a condition for 'consistently providing quotes that pass basic validation rules' condition. In embodiments, when less than 3 values are available, a tracking error calculation may not provide meaningful information.

4. For all currently eligible submitters, calculate the tracking error: $TE_i$ between the bank's submitted quotes and the VWAP traded price from the days where there was a quote from the submitter and a trade in the window. These tracking errors reflect the track record of each submitter in providing quotes that agree with traded prices. Submitters with a small tracking error provide quotes that are closer to VWAP traded prices.

5. Calculate the average of the smallest two tracking errors from eligible submitters and use this as the tracking error benchmark: TE Benchmark.

6. For all eligible submitters (note that doing this for all submitters may provide diagnostic information), calculate the 1-day quoted price volatility: $\sigma$ from quotes submitted inside the window. The price volatility may be calculated as follows:

Define the percent return across two observations as:

$$R_i = Q(t_i)/Q(t_{i-1}) - 1$$

And $d_i$ is the number of business days between these two observations:

$$d_i = t_i - t_{i-1}$$

Then the mean is:

$$\mu = \frac{\sum_{i=1}^{N} R_i}{\sum_{i=1}^{N} d_i}$$

and second moment:

$$\mu_2 = \frac{1}{N} \sum_{i=1}^{N} \frac{R_i^2}{d_i}$$

average number of business days between observations:

$$d = \frac{1}{N} \sum_{i=1}^{N} d_i$$

Then the price volatility for each submitter is calculated using:

$$\sigma = \sqrt{\mu_2 - d\mu^2}$$

7. Calculate the median of the acceptable submitters 1-day price volatility, and the average number of trades per day in the window, and use these to compute the price volatility benchmark:

$$\text{Volatility Benchmark} = \frac{\text{median}(\sigma)}{\sqrt{\text{average}(\text{tradecount})}}$$

The purpose of taking the median price volatility is to ensure that it is reasonably stable and unaffected by outliers and persistent bad data. In embodiments, a separate source of benchmark volatility may be supplied instead. However, the sources should be responsive to current price volatility, as is the case with the proposed method, which is calculated using a window of time. This calculated quantity is the volatility benchmark that will be used as a floor on the acceptable tracking error. The intent is to avoid cases where the calculated tracking errors are anomalously small.

8. Calculate the tracking error acceptance threshold:

$$TE \text{ Threshold} = 2.0 \times \max(TE \text{ Benchmark, Volatility Benchmark})$$

The factor of 2.0 in this formula can be tuned to allow a narrower or wider range of tracking errors. This current form ensures that the two submitters with the smallest tracking error are always under the threshold (and therefore accepted), and the requirement that we have a quorum is that at least one more is also under the threshold.

9. Any submitter that has a tracking error larger than TE Threshold is assigned eligible=False 1.3 Calculate the Performance Filtered Composite (PFC) Price In embodiments, the PFC price may be an average of prices from eligible submitters.

Aspects of an example method of calculating a PFC price is outlined below.

On a given day when a PFC is to be calculated the eligibility flags are available as of T-2, so for a given security the first step is to source the "PFC eligibility" flags:

TABLE 2

Example eligibility flags for the PFC calculation

| Submitter | eligibility_bid | eligibility_ask |
|---|---|---|
| B1 | True | False |
| B2 | True | False |
| B3 | True | True |
| B4 | False | True |
| B6 | True | False |
| B8 | False | False |

Separately for bid and ask, the eligibility calculation may be an equal-weighted average over submitted prices from eligible submitters. In embodiments, PFC price may be based on submitters that have eligible bid and/or eligible ask prices. Submitters that do not have eligible bids or eligible ask prices may be excluded from the PFC price calculation. For example, based on the example evaluations in table 2, submitter B8 may be excluded from PFC price calculation, submitter B4 may be excluded from the PFC bid price calculation, and submitters B 1, B2, and B6 may be excluded from the PFC ask price calculation. In embodiments, the PFC prices may be computed as an average of prices from the eligible submitters where a sufficient number of eligible quotes exist. In some embodiments, A PFC price is only computed if there are at least three or more eligible bid and/or ask prices.

In embodiments, a PFC price is separately computed for a bid and an ask. In some cases, based on the number of valid submitters providing a bid or an ask price, the calculations may generate both a valid bid and ask price, one of a valid bid or ask price, and no valid bid and ask prices. When one or both valid bid and ask prices cannot be computed using these calculations, such as when there is an insufficient number of eligible quotes, a fall back price method may be used.

1.4 Calculating the Price Volatility

In embodiments, a price volatility calculation may be an estimate that compensates for missing daily observations. In embodiments, price volatility may be calculated as the daily % volatility calculated in a way that is adjusted for gaps in the submitted quote data. In embodiments, price volatility may be calculated as the daily percent volatility that accounts for gaps in price observations by scaling each return observation to an equivalent 1-day return.

Aspects of an example method of calculating price volatility is outlined below.

In embodiments, a calculation may be derived from the log-likelihood of the observations of unequal length returns:

$$lnP = -\frac{1}{2}\sum_{i=1}^{N}\frac{(R_i - \mu\ d_i)^2}{\sigma^2 d_i} - \frac{N}{2}\ln\sigma^2 - \frac{1}{2}\sum_{i=1}^{N}\ln d_i - \frac{N}{2}\ln 2\pi$$

$$R_i = Q(t_i)/Q(t_{i-1}) - 1$$

so that the derivative wrt mu gives:

$$\sum_{i=1}^{N}\frac{(R_i - \mu\ d_i)d_i}{\sigma^2 d_i} = 0$$

so that:

$$\mu = \frac{\sum_{i=1}^{N} R_i}{\sum_{i=1}^{N} d_i}$$

We'll need this:

$$\mu_2 = \frac{1}{N}\sum_{i=1}^{N}\frac{R_i^2}{d_i}$$

and this:

$$d = \frac{1}{N}\sum_{i=1}^{N} d_i$$

and with respect to (wrt) sigma:

$$\frac{1}{2}\sum_{i=1}^{N}\frac{(R_i - \mu\ d_i)d_i}{\sigma^4 d_i} - \frac{N}{2\sigma^2} = 0$$

so that the volatility is given by:

$$\sigma^2 = \frac{1}{N}\sum_{i=1}^{N}\frac{(R_i - \mu\ d_i)^2}{d_i} = \frac{1}{N}\sum_{i=1}^{N}\frac{R_i^2}{d_i} - \mu^2\frac{1}{N}\sum_{i=1}^{N} d_i$$

or:

$$\sigma = \sqrt{\mu_2 - d\mu^2}$$

2 The Selection of Trades for PFC Eligibility

In embodiments, trade data may be processed and/or maintained for the purpose of ensuring the right values are used as inputs to the methods and systems described herein. In embodiments, rules may be applied to the dataset. Rules may be used to select specific trade data from a set of trade data for the calculation of the PFC. In some cases, rules may be used to filter and/or remove some data from a set of trade data before the set of trade data is used for the calculation of the PFC. In some embodiments, rules may be used in an automated setting and/or algorithm in which the trade data that does not satisfy one or more rules may be automatically removed or filtered. In some embodiments, rules may be used to mark or flag trade data, and the flagged trade data may be further reviewed by a user. In some cases, machine learning and/or artificial intelligence (AI) algorithms may be used to refine the rules. In some cases, machine learning and AI algorithms may be trained on a set of trade data that has been previously identified as being acceptable or not acceptable for PFC calculations, and the rules may be automatically generated.

In some embodiments, rules may be used to determine and/or verify that execution time on cancel/correction records are as of the time of the adjustment. In some embodiments, rules may be used to determine and/or verify that trades with an execution date that falls on a weekend have been pushed to the next earlier business date.

In some embodiments, a number of other rules are applied.

In one embodiment, rules may be used to determine and/or verify if a trade was an agency trade or client trade.

In one embodiment, rules may be used to determine and/or verify if the customer account type is an institutional account or retail and/or if the account is a fee-based account. In some cases, only the institutional and accounts that are not fee-based are selected. In some cases, a fee-based account may correspond to a retail account and may be removed from consideration.

In one embodiment, rules may be used to determine and/or verify if trades are associated with a primary market. In some embodiments, new/re-opened security trades may be removed from considerations since they may correspond to investors that are primarily interested in secondary market liquidity. In embodiments, the methods and systems described herein may involve filtering out trades that reflect trading in the secondary market and client side activity to ensure volumes are fairly represented.

In one embodiment, rules may be used to determine and/or verify a related party such as a related institution; trades with related institutions may appear to be where a single trade was split into multiple counterparty accounts.

In one embodiment, rules may be used to determine and/or verify trades that are identical or near identical except for quantity and are identified as a single trade. Identical trades may be replaced with a single record with a quantity equal to the sum of the individual record quantities. Determination of identical or near identical trades may be based on the analysis of values such as bank id, issuer name, issuer business division, issuer id, execution date, settlement date, side, price, yield, identification of primary market, a related party, and the like.

In one embodiment, rules may be used to determine and/or verify trades with an adjusted date. An adjusted data may sometimes be calculated where the execution date is on a weekend/holiday it is pushed backwards to the prior business day.

In some embodiments, rules may be used to determine and/or verify trades that have a matching buy and sell record (for example, which may be on the same day). In some embodiments, trades that have a matching buy and sell record in the same day are removed. In some embodiments, trades that have a matching buy and sell record may be identified with matching values for one or more of an execution date, bank id, issuer and/or division id, quantity, price, and the like.

In some embodiments, rules may be used to determine, omit and/or verify trades with a quantity less than a threshold quantity. In some embodiments, trades that have a quantity less than a threshold quantity may be removed. The threshold quantity may be set to 25,000. In some embodiments, trades may first be aggregated into one record, and the quantity in an aggregated record may be compared to the threshold quantity.

3. The Tracking Error ("TE") Calculation

The tracking error calculation quantitatively measures concordance of a price series with the trade history. The tracking error may be the mean square of the % difference of the executed and quote prices across days on which at least one trade was done. The tracking error may be an input to the calculation of the performance filtered composite price. In embodiments, tracking error calculation may be determined for one or more time periods or time windows. Time windows may be predetermined or dynamically selected. For days in the time window, changes in the prices may be determined. The daily changes in prices in the time windows may further be analyzed by computing statistics of the changes such as a mean or the standard deviation of the days in the time window. The tracking error calculation may further include adjustments for outliers. In embodiments, prices or differences in prices, that are outside of a specified or determined standard deviation (such as outside of 4 standard deviations) may be removed from the calculation and the mean and the standard deviation of the remaining price differences may be computed. A tracking error may be computed as a square root of the sum of the squares of the mean and the standard deviation of the remaining price differences. The tracking error may be computed for each day in a time window or as a single value for all the days in the time window. In some embodiments tracking error may be computed for time granularities such as weeks, months, hours, minutes, and the like.

4 The Fallback Composite ("FC") Calculation

In embodiments, the methods and systems described herein may include one or more calculations or determinations of a fallback composite price. In embodiments, the methods and systems described herein may include a PFC price calculation detection. In some embodiments, the methods and systems may detect when the PFC price calculation fails to generate a valid price. In some embodiments, the methods and systems may determine a confidence score of the calculated PFC price. In some embodiments, when the PFC price calculation fails to generate a valid price and/or the confidence score of the calculated PFC price is below a confidence threshold, other pricing calculations and/or methods may be used to generate a fallback composite price.

In one embodiment, an average submitted price may be used as a fallback composite price. In some cases, an average submitted price may be used for some security types when they do not trade in any significant sizes, trade infrequently, and/or may not always be priced by more than three dealers. The average submitted price may be an average over clean submitted quotes from all submitters, separately for bid and ask.

In one embodiment, a single dealer price may be used as fallback composite price. In some embodiments, in the absence of two or more dealer quotes, a clean single dealer quote may be provided.

In one embodiment, in the absence of a security for which there are no trades, but for which a pricing curve may be constructed from other validated security prices, another price called an "evaluated price" may be derived (discussed herein) to support this scenario. A security that typically has a PFC price, but on a given day the submissions do not support it, yesterday's spread used against today's curve or benchmark security would likely lead to a sufficiently high-quality price. In this case, another price called an "evaluated price" may be derived to support this scenario. Providing evaluated pricing as a stop gap to composite pricing may ensure that a reference price is always generated for a given security on any given trading day.

Figure 4:
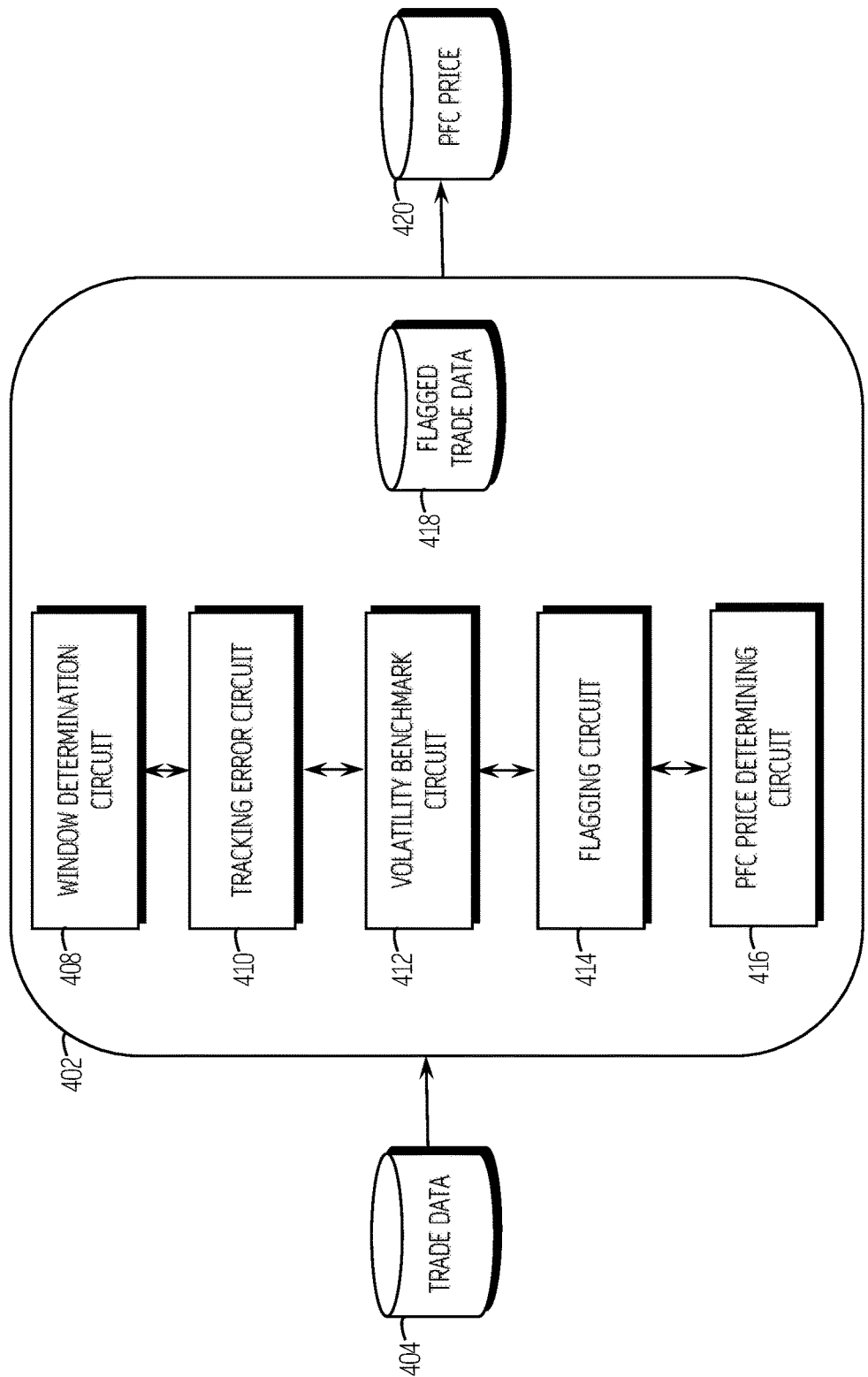
FIG. 4 depicts aspects of an apparatus for determining the performance filtered composite price.

FIG. 4 shows aspects of an apparatus 402 for determining the performance filtered composite price. The apparatus may be include and/or perform functions of one or more facilities of the platform 200. For example, the apparatus may perform functions of the analysis facility 208 and validation facility 206 and/or interfaces facility 210.

In embodiments, the apparatus 402 may receive data from one or more sources such as the apparatus 302. The data may be trade data 404 that has been validated and/or adjusted.

The apparatus may include a window determining circuit 408 that is structured to analyze the trade data 404 to identify a time window that has sufficient trades with sufficient number of submitters as described herein. The window determining circuit 408 may search the trade data 404 and use time stamps in the data to identify an appropriate time window.

In embodiments, the apparatus 402 may include tracking error circuit 410 for computing a tracking error for the trades for the time window determined by the window determining circuit 408. The tracking error may be computed by the methods described herein and may include determining a tracking error for each submitter and taking an average of the tracking errors and determining a tracking error benchmark as described herein. The apparatus 402 may include a volatility benchmark circuit 412 configured to determine the volatility of the trade data 404 which is used by the flagging circuit 414 to determine eligibility flags based on the tracking error threshold. The flagging circuit 414 may include tags to the trade data 404 to mark or tag eligible submitters. The apparatus 402 may include a performance filtered composite (PFC) price determining circuit 416. The PFC price determining circuit 416 may determine a PFC price 420 based on the trade data 404.

5. Financial Information Systems Platform Design

Figure 5:
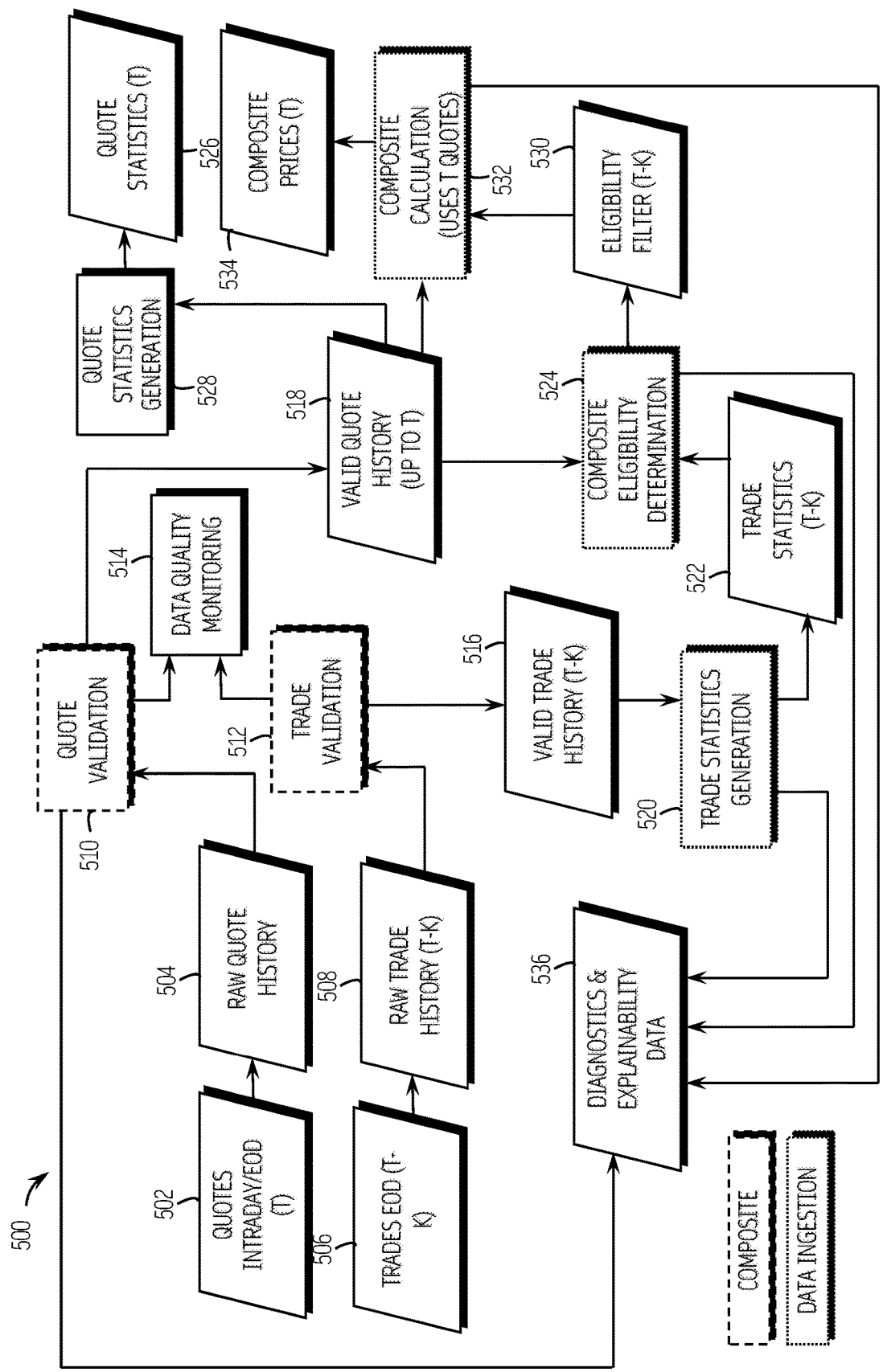
FIG. 5 depicts an embodiment of an information system platform.

FIG. 5 shows a structure of one embodiment of a financial information systems platform 500. The embodiment of FIG. 5 may be used to deliver the methods described herein. In embodiments, the systems may include hardware components, software components, databases, telecommunications networks, human resources, technical process and procedures, and the like.

In embodiments, one or more processes and/or algorithms may be used to convert data feeds received from dealers into composite prices. The composite prices may be based on the performance filtered composite price, a simple averaging method and/or a fallback composite calculation in the absence of being able to validate quotes against minimum threshold trading activity.

In embodiments, data feeds may include quotes 502 and may include intraday or end of day (EOD) quotes for times T. Data feeds may further include trades 506 data such as EOD trades data for a time window such as T-K (wherein T is the point in time and K is the number of days back, e.g. 2-5 days.). The data feeds may be aggregated into history feeds 504, 508. The platform 500 may include quote validation components (such as Level 1 or Level 2 validations) 510 and trade validation components 512. Quote validation 510 and trade validation 512 components may send and receive data with a data quality monitoring component 514. Valid trade histories 516 and valid quote histories 518 may be determined based on trade validation 512 and quote validation 510 components, respectively. Using the valid trade history 516, trade statistics 522 may be generated with a trade statistics generator 520. Using the valid quote history 518, quote statistics 526 may be generated with a quote statistics generator 528. The platform 500 may use the valid quote history 518 and trade statistics 512 to determine an eligibility filter 530 with a composite eligibility determination component 524. The platform 500 may further include a composite calculation component 532 that determines composite prices 534 based on the valid quote history 518 and the eligibility filter 530. The platform may further collect diagnostics and explainability data 536 which may be used for further adjustments on models and data management.

Figure 6A:
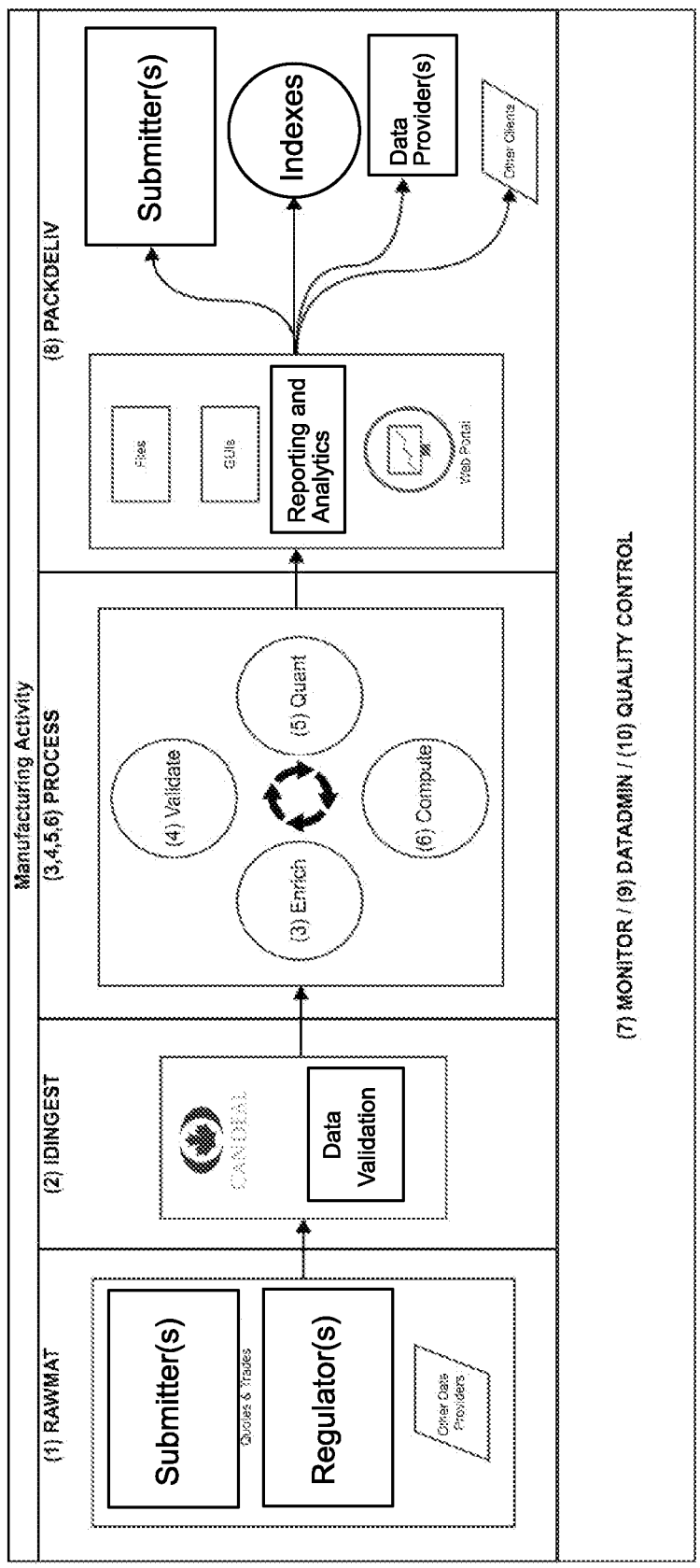
FIG. 6A-6B depict aspects of information flow and data processing.

FIG. 6A depicts aspects of process activities. FIG. 6A depicts some of the information manufacturing activities that turn raw quote data into reference prices. In embodiments, activities may include operations and activities related to raw materials of the system. In embodiments, raw materials, as used in the context of the application, may be raw data, data feeds, trade data, historical data, and the like. In embodiments, activities may include raw materials sourcing and cataloging, raw materials enrichment, raw materials identification, ingestion, cross-referencing, validation, and rejection. In embodiments, activities may include quantitative analytics, modeling and research, computation and tolerances, monitoring, tracking, error handling, and reporting. In embodiments, activities may include packaging and delivery, such as packaging of data. In embodiments, activities may include data administration, price challenges, management and reporting, quality control, and the like.

In embodiments, raw materials, as used herein, may be raw data, data feeds, trade data, historical data, and the like. In embodiments, activities may include raw materials sourcing and cataloging, raw materials enrichment, raw materials identification, ingestion, cross-referencing, validation, and rejection. In embodiments, activities may include quantitative analytics, modeling and research, computation and tolerances, monitoring, tracking, error handling, and reporting. In embodiments, activities may include packaging and delivery, such as packaging of data. In embodiments, activities may include data administration, price challenges, management and reporting, quality control, and the like.

Figure 6B:
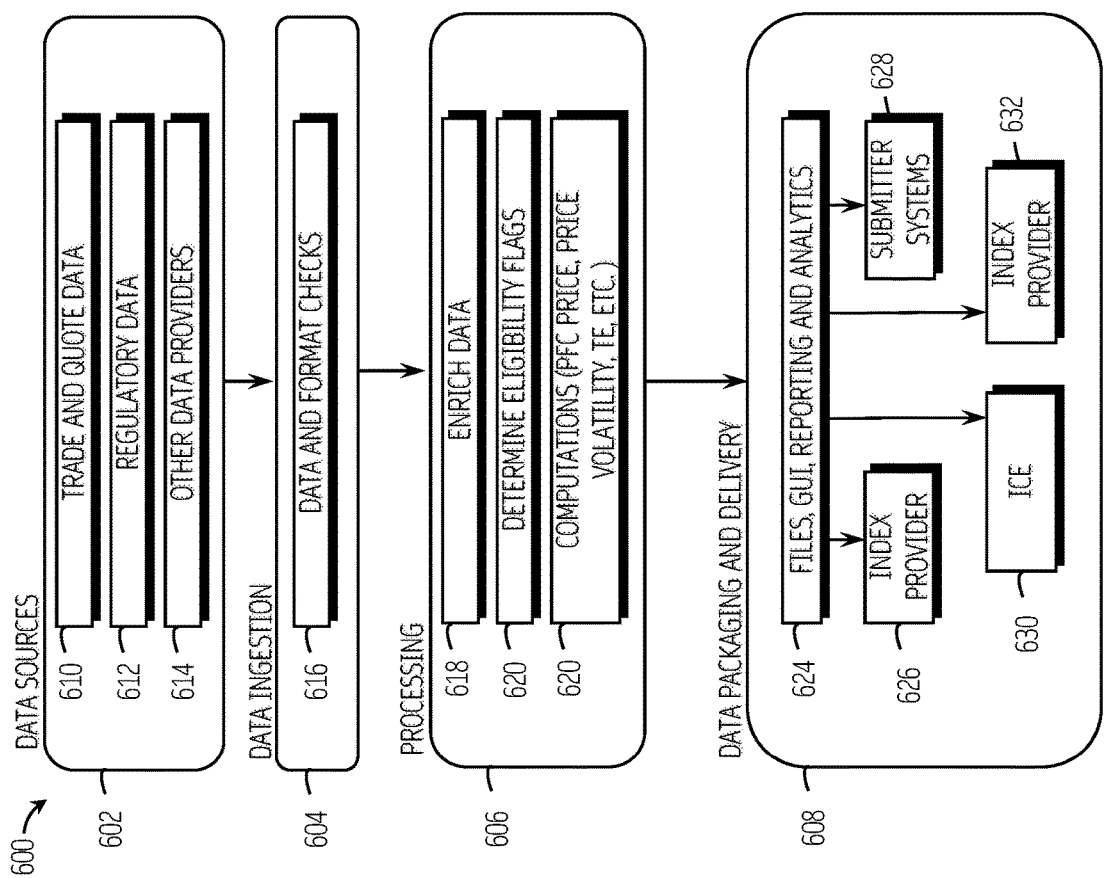

FIG. 6B depicts aspects of process activities. FIG. 6B depicts some of the information manufacturing activities that turn raw quote data into reference prices. In embodiments, the system may receive data from data sources 602. Data sources 602 may include data feeds, databases, files, server data, and the like that may include trade and quote data 610 from primary submitters such as primary submitters and other submitters. Data sources may be distributed across one or more physical data storage elements and be found in different servers, computers, countries, regions, and the like. Data sources 602 may include trade data reports sent to regulatory bodies and may be sourced from submitters, dealers, regulators, or other parties. Data sources 602 may include data from other data providers and may include statistical data, other trade data, market data, and the like. Data from data sources 602 may be received by data ingestion elements 604. Data ingestion elements 604 may include processors, servers, router elements, and the like. Data ingestion may include receiving data feeds from one or more data sources 602. Data ingestion may include receiving data in response to sending queries or requests for data to one or more data sources. In embodiments, data ingestion may include data and format checks 616 and may include one or more of the Level 0, Level 1, and Level 2 checks described herein. Ingested data may be received by processing elements 606. In embodiments, processing elements 606 may include one or more of the same data ingestion elements 602. In some embodiments, processing elements 606 may be separate from the data ingestion elements 604. In embodiments, processing elements 606 may perform computations 622, determine eligibility flags for data 620, and further enrich the data 618. In embodiments, determination of eligibility flags 620 may include evaluation of one or more of the criteria for selection of trades for PFC eligibility as described herein. In embodiments, computations 622 may include computations related to PFC price, price volatility, tracking error, and the like. In embodiments, processed data may be further received by the data packaging and delivery elements 608. In embodiments, data packaging and delivery elements 608 may include one or more of the elements or types of elements used for data ingestion and processing. In some embodiments, data packaging and delivery elements 608 may be separate from the data ingestion elements 604 and processing elements 606. Data packaging and delivery may include generation of files, summaries, reporting analytics, graphical user interfaces (GUI) 624, and the like for reporting and/or presenting results of the processing of data. In embodiments, packaging and delivery of data may include PFC price data and related trends, history, price statistics, graphs, visualizations, and the like. In embodiments, data may be provided to one or more users or entities such as index providers, which may also function as an exchange, clearinghouse, and financial data provider 630, submitter systems 628, and other clients 632. In embodiments, data may be sent directly to remote users and entities periodically at a scheduled time or after an event. In some embodiments, data may be available for users and entities to access via one or more GUIs or data portals from which users or entities may request data.

In embodiments, processed data may be used by one or more of the users and entities to evaluate values of assets, determine or evaluate investment strategies, generate reports with market summaries or recommendations for clients, and the like. In some embodiments, processed data, such as computed price, may be an input to a system that provides alerts to users, executes or initiates trades, and the like. Processed data may be provided to a system that executes a conditional trade instruction based on a determined price. In some embodiments, price thresholds may be set. The price data from the processing may be compared to the price thresholds and an alert to a supervising user or entity generated in relation to the price threshold being reached or exceeded. An alert may include instructions or actionable elements, allowing a user to approve or deny an action. In embodiments, price thresholds may include an absolute buy or ask prices, relative buy or ask prices, differences between ask and buy prices, changes in prices, no price data, and the like. In embodiments, performance filtering may be assessed or compared to processing without performance filtering or other data or historical performance to determine if performance filtering has measurable impact. In some cases, based on the comparisons or other evaluations, performance filtering parameters, criteria, rules, and the like may be adjusted, removed, added, and the like. In some cases, a periodic or continuous feedback loop may be used to periodically or continuously assess the effects of performance filtering and modify the parameters of performance filtering.

Figure 7:
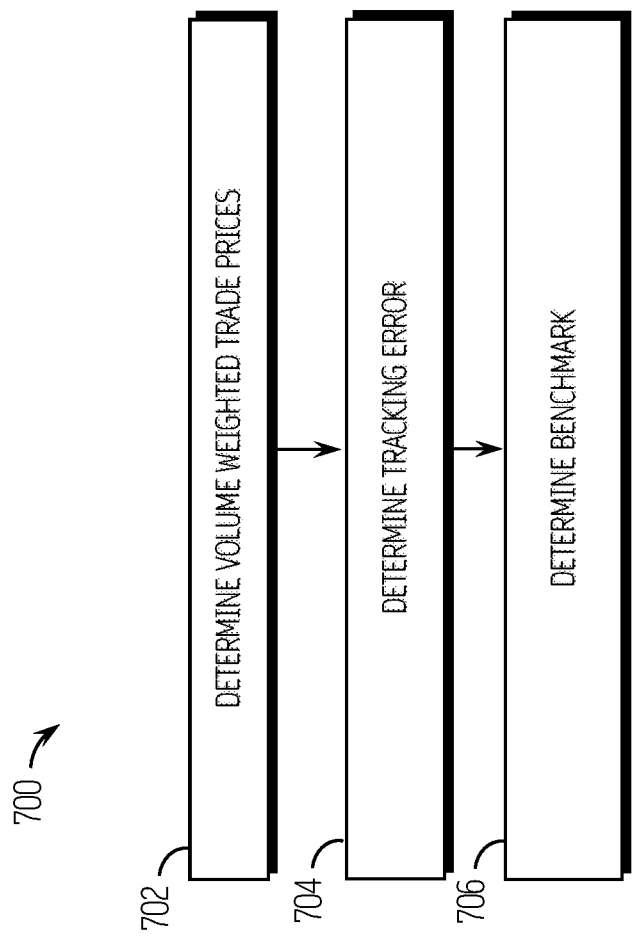
FIG. 7 depicts aspects of tracking error determination.

FIG. 7 depicts a summary of some aspects of the methods and systems described herein. FIG. 7 depicts aspects of determining a tracking error. Tracking error provides a measure of how far (on average) end of day prices are from traded prices. In some embodiments, rules may be used to determine, omit and/or verify trades with a quantity less than a threshold quantity. In some embodiments, large transactions may be filtered if the transaction is larger than a threshold. The size of a transaction may be determined by the quantity of trades or the product of the quantity of trades and prices for each trades. In some embodiments, trades that have a quantity less than a threshold quantity may be removed. In some embodiments, multiple smaller trades in a time window that corresponds to an entity or a set of entities may first be aggregated into one record and the size of the transaction may be evaluated using the aggregate.

Tracking error may be based on volume-weighted average traded price and/or trade filters 702. Tracking error may include a tracking error calculation 704 and a tracking error benchmark 706, which may be based, at least in part, on price volatility.

Determining volume weighted trade prices 702 may include determining a volume weighted average traded price (VWAP) separately for buys and sells according to the following:

$$VWAP = \frac{1}{\text{Total Quantity}} \sum_{i=1}^{Ntrades} \text{Quantity}_i \times \text{Price}_i$$

In embodiments, large transactions may or may not be filtered and where there are no trades there is no VWAP.

Determining tracking error 704 may include calculating the %-difference for every day which has a quote and trade according to the following:

$$\%diff_t = \frac{\text{Quote}_t - VWAP_t}{avg(\text{Quote}_t, VWAP_t)}$$

The tracking error (TE) may therefore be computed as the mean-square average of the %-differences:

$$TE = \frac{1}{N_{days}} \sum_{i=1}^{Ndays} (\%diffi)^2$$

Figure 8:
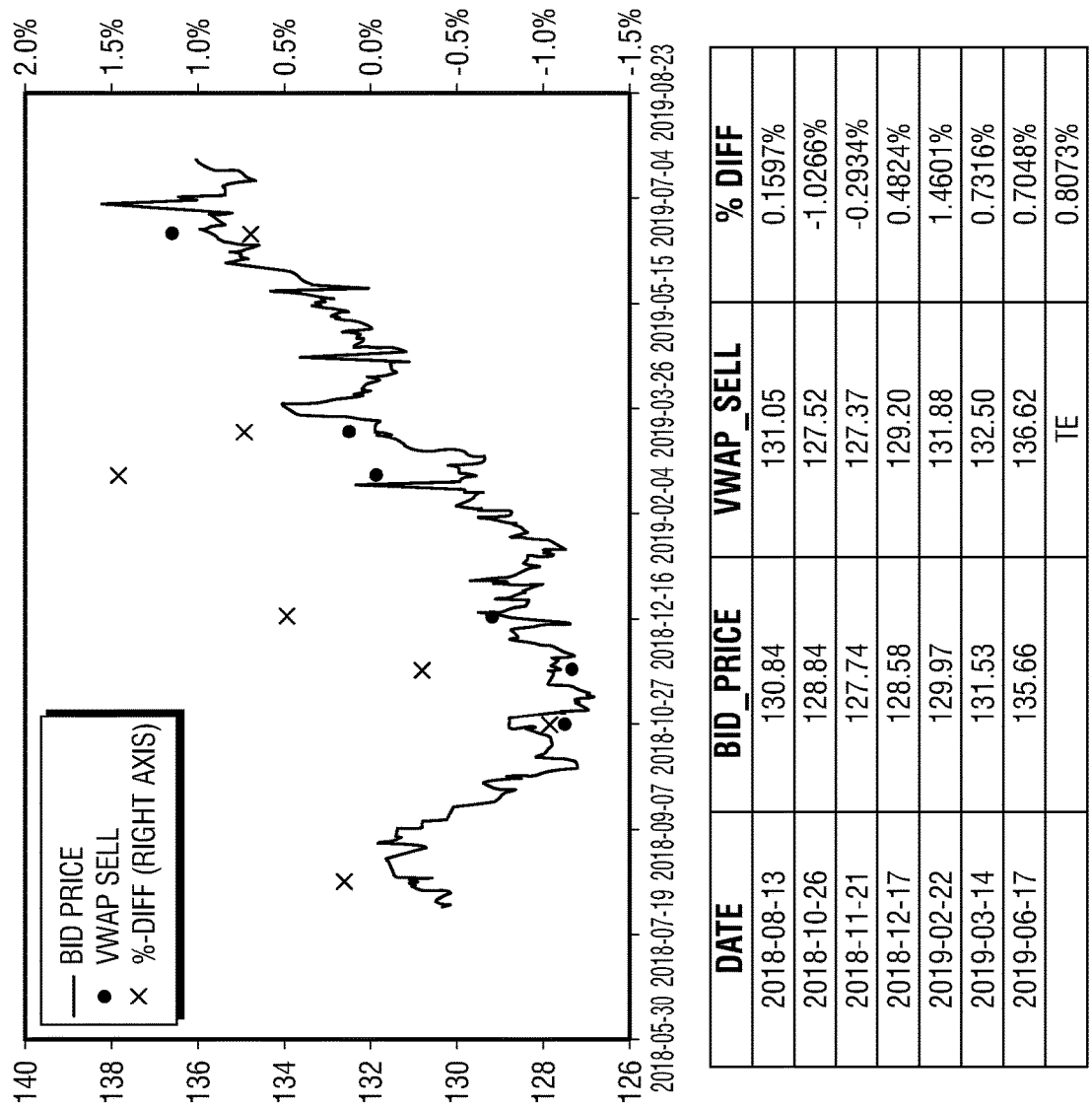
FIG. 8 depicts aspects of an apparatus for determining the performance filtered composite price.

FIG. 8 depicts aspects of an example calculation of %diff and TE. The graph and table of FIG. 8 show example data for which %diff is determined for each date and a tracking error is determined for the seven days according to the formulas above.

Figure 9:
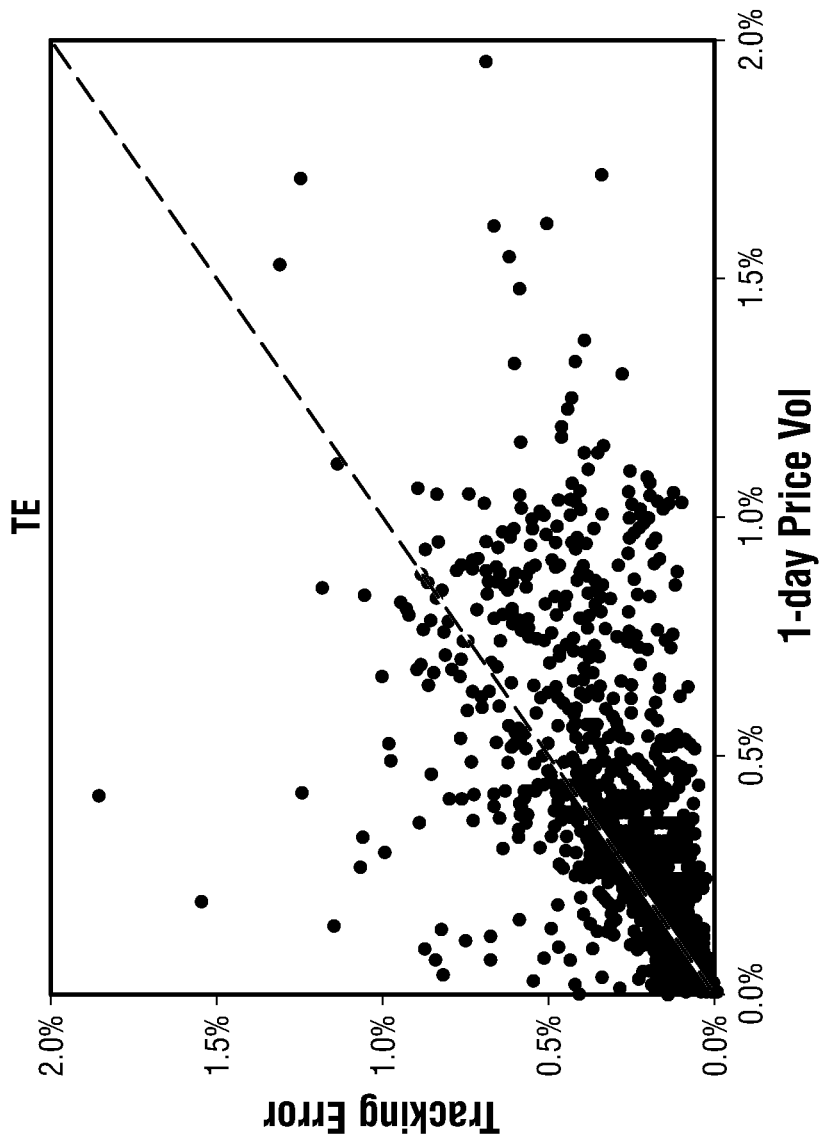
FIG. 9 depicts aspects of example data visualizations and calculations in accordance with an embodiment of the current disclosure.

The tracking error is generally similar to the one day price volatility σ. In embodiments, determining a benchmark 706 may include determining $$TE(\text{bench}) \sim \sigma/\sqrt{n}$$

Where n is the average number of trades that occur on days with trading. FIG. 9 depicts aspects of similarity of tracking error and price volatility for sample data. FIG. 9 shows a visualization of pricing behavior anomalies. Single bank (a point on the graph) can deviate from VWAP and tracking error (TE) can be used to show the deviation. TE threshold provides screening of those passing minimum acceptable error and prevent skew from any one if they deviate from the TE by a threshold.

Figure 10:
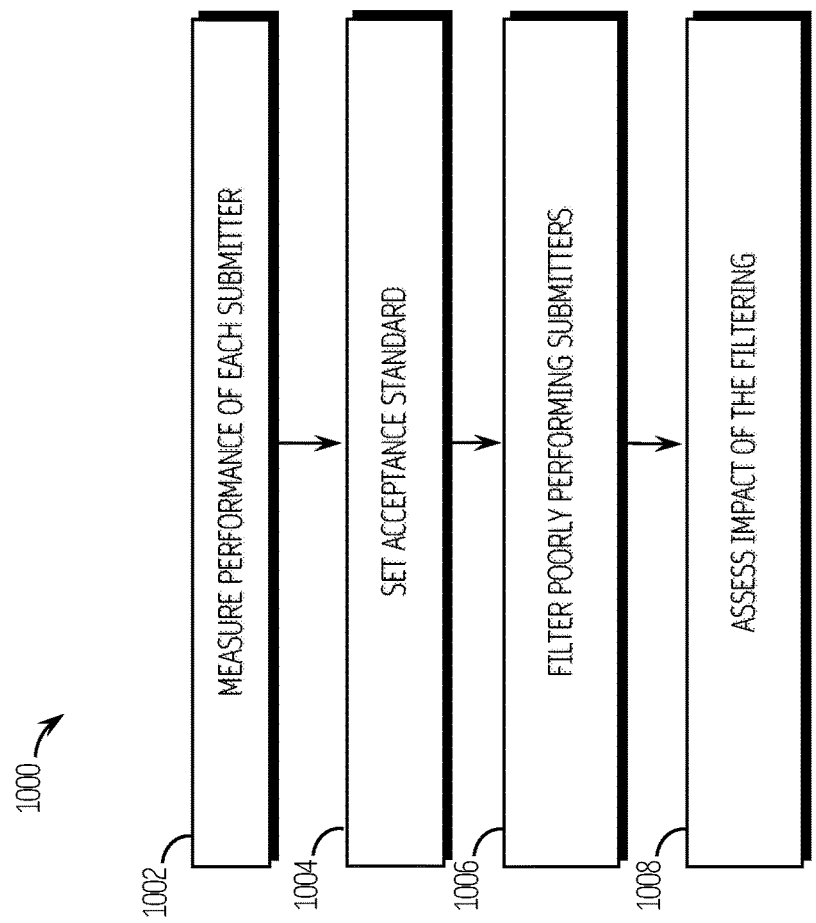
FIG. 10 depicts aspects of performance filtering.
Figure 11A:
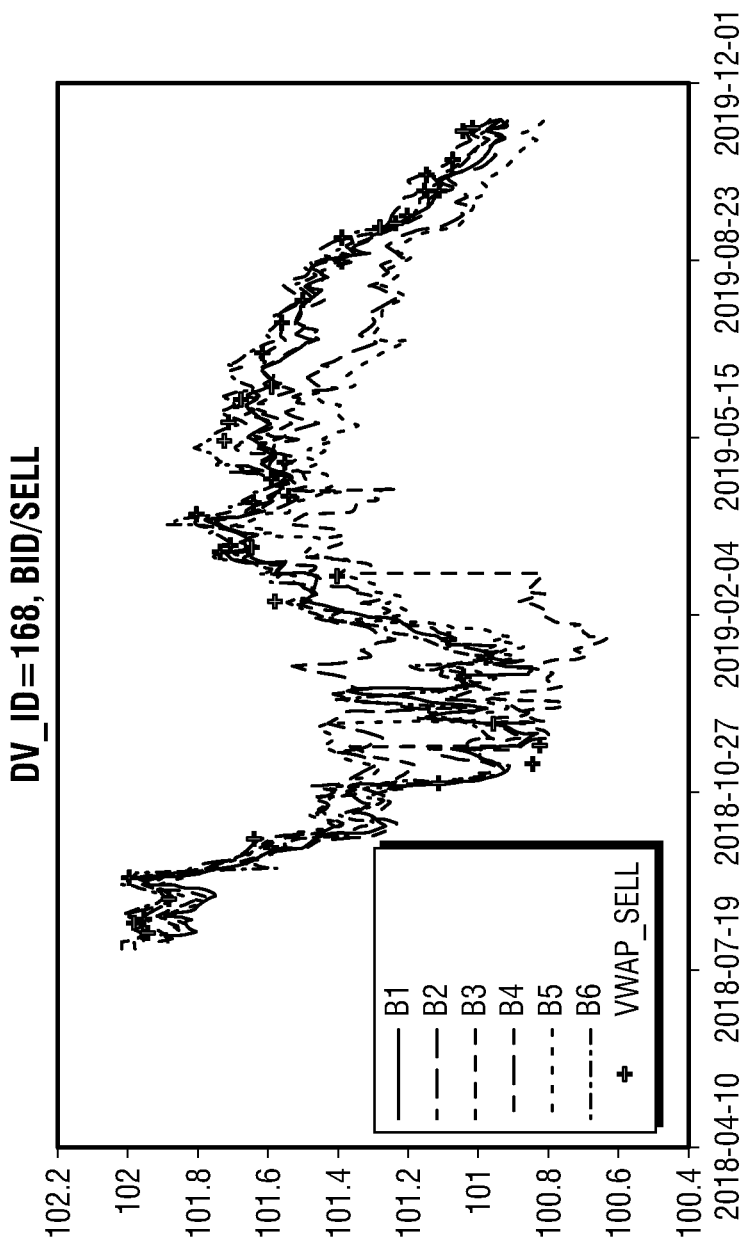
FIGS. 11A-11B depict aspects of example data visualizations and calculations in accordance with an embodiment of the current disclosure.
Figure 11B:
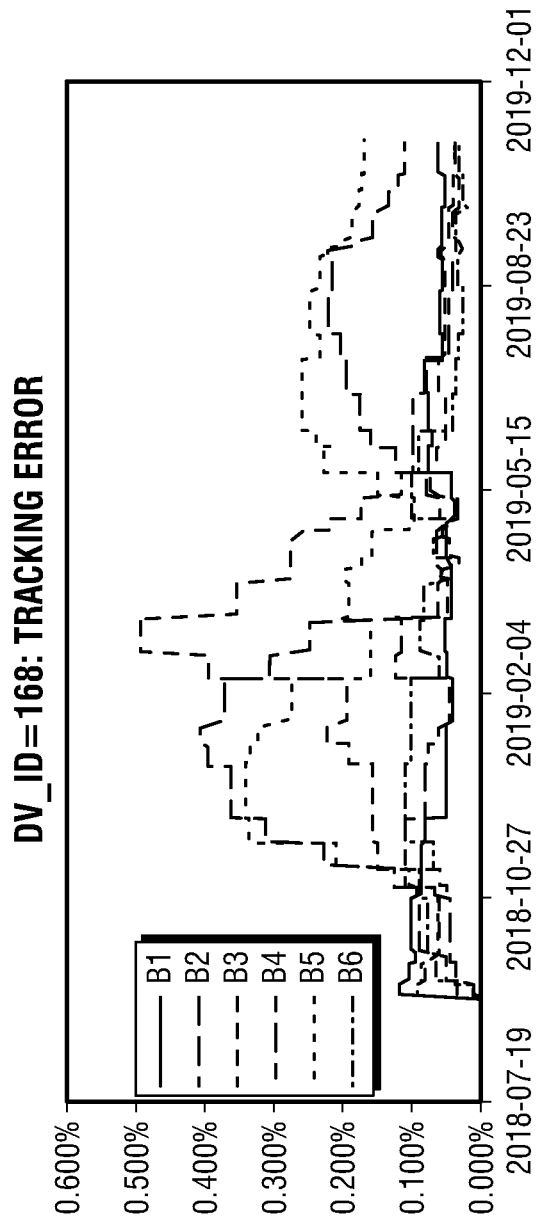

FIG. 10 depicts a summary of some aspects of the methods and systems described herein. FIG. 10 depicts aspects of determining a performance filtering. Performance filtering, as used herein, may measure the performance of each submitter, set acceptable standards, omit poorly performing submitters, and provide validation. Performance filtering may be performed separately for bid and ask for each day. Performance filtering may be used to measure the performance of each submitter and allow filtering of submitters based on their performance. Performance filtering may be based on a time window, in some cases, the time window may be the shortest window with at least five trades. For the time window, the tracking error for each submitter's quotes may be calculated against these trades. In embodiments, a tracking error cutoff threshold may be determined, and submissions with a tracking error larger than the threshold may be filtered. Using the filtered submissions, a composite price may be calculated using the methods described herein. In practical applications, the performance filtered price may provide better performance by reducing tracking error.

Performance filtering may include measuring performance of each submitter 1002. Measuring performance may include finding the shortest windows with at least five trades and calculating the TE for each submitter's quotes against these trades. Performance filtering may further include setting an acceptance standard for a submitter 1004. In one example a standard may be a TE cutoff threshold determined by:

$$TE\ \text{Cutoff}=2.0*\max(TE(\text{bench}), \text{avg}(\text{smallest two } TE))$$

Using the TE cutoff poorly performing submitters may be filtered 1006. In embodiments, submissions with TE larger than the threshold may be filtered. The effect of the filtering may be assessed 1008 by calculating the performance filtered composite price from the quotes from the submitters with TE less than the threshold. The performance filtered price may be compared to the unfiltered price. FIGS. 11A-11B and 12A-12B show aspects of trade data and aspects of tracking error for example trade data set for different banks (B1-B6). FIG. 13 shows aspects of submission filtering based on TE larger than a threshold. FIG. 13A shows unfiltered trade data and FIG. 13B shows the filtered data according to the TE cutoff.

Figure 14:
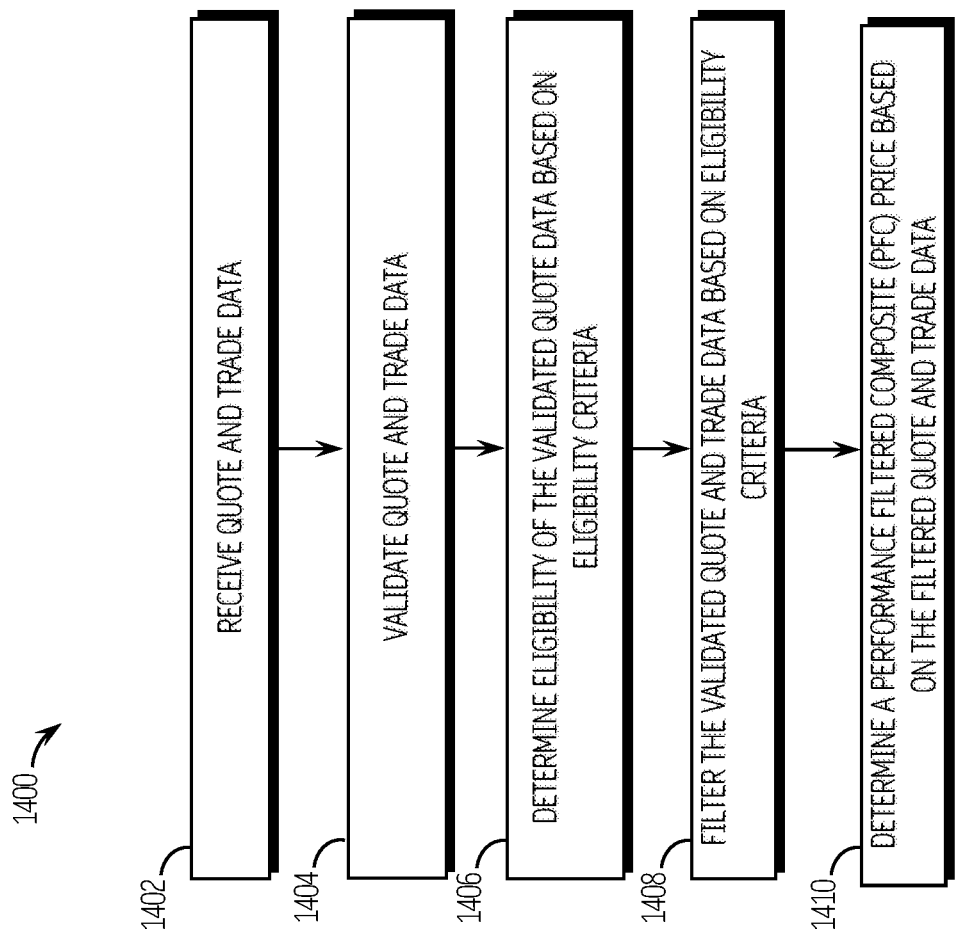
FIG. 14 depicts aspects of a method.
Figure 15A:
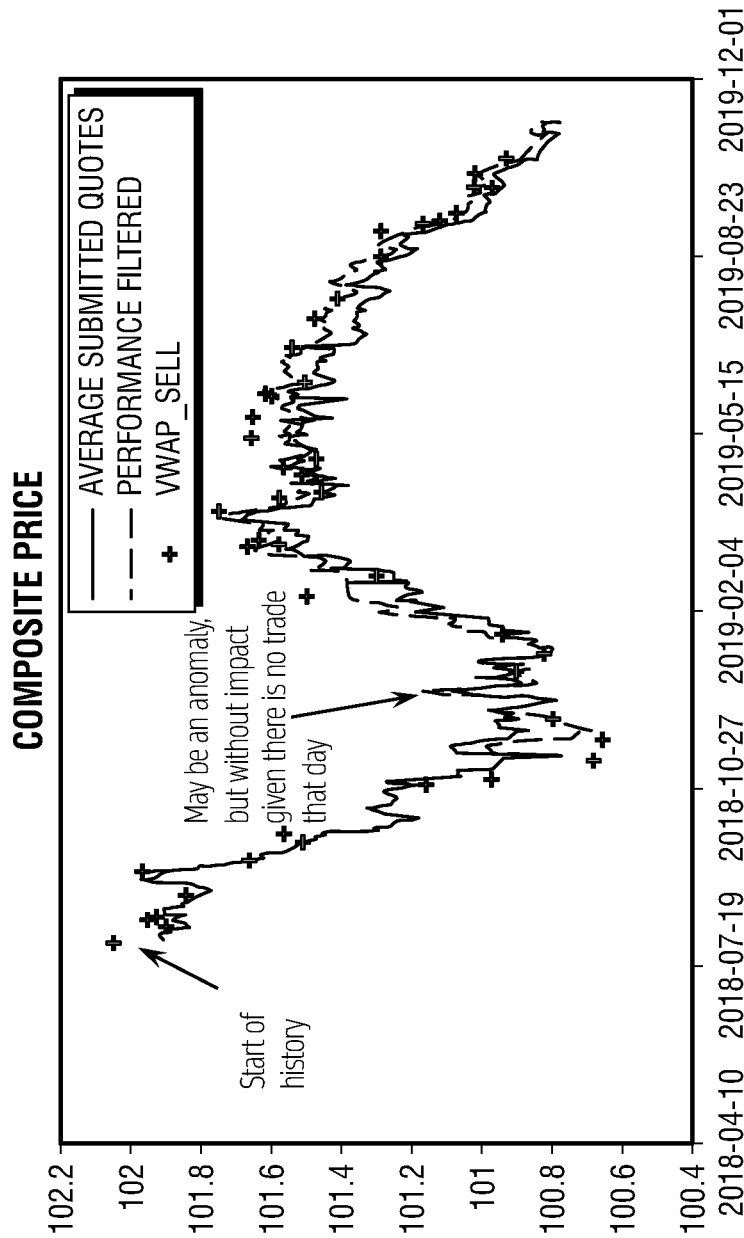
FIGS. 15A-15B depict aspects of example data visualizations and calculations in accordance with an embodiment of the current disclosure.
Figure 15B:
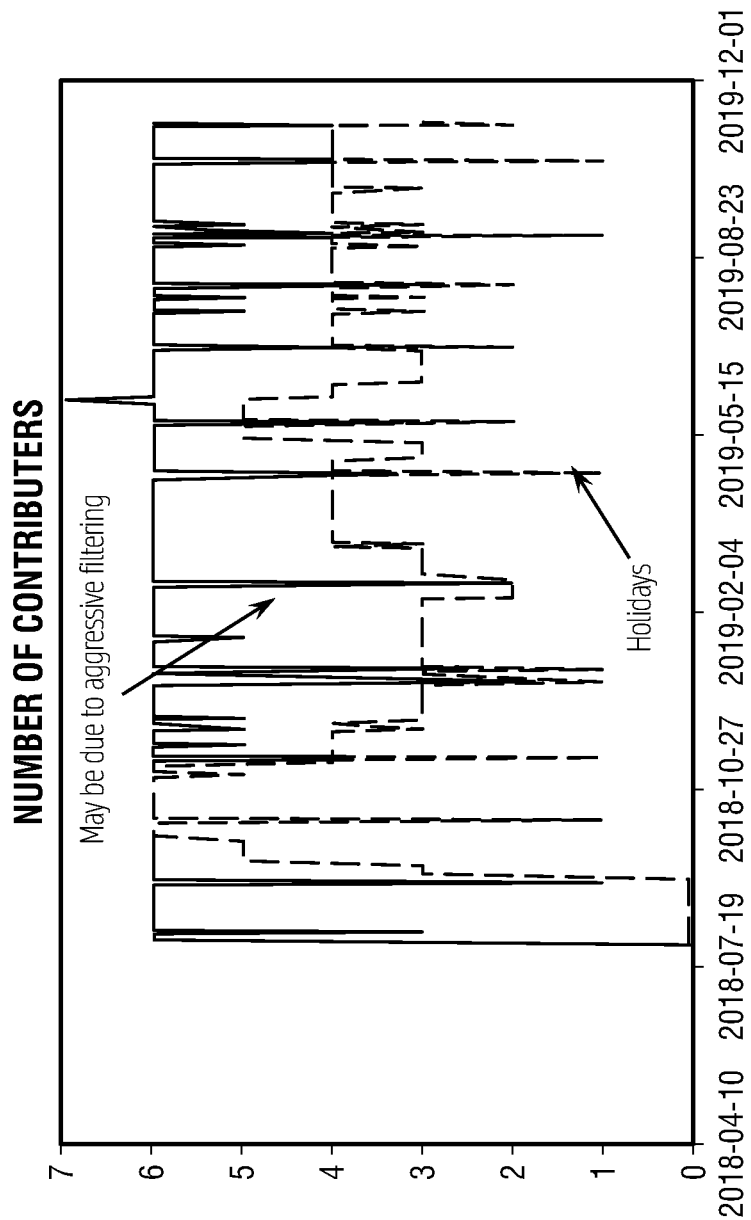
Figure 16:
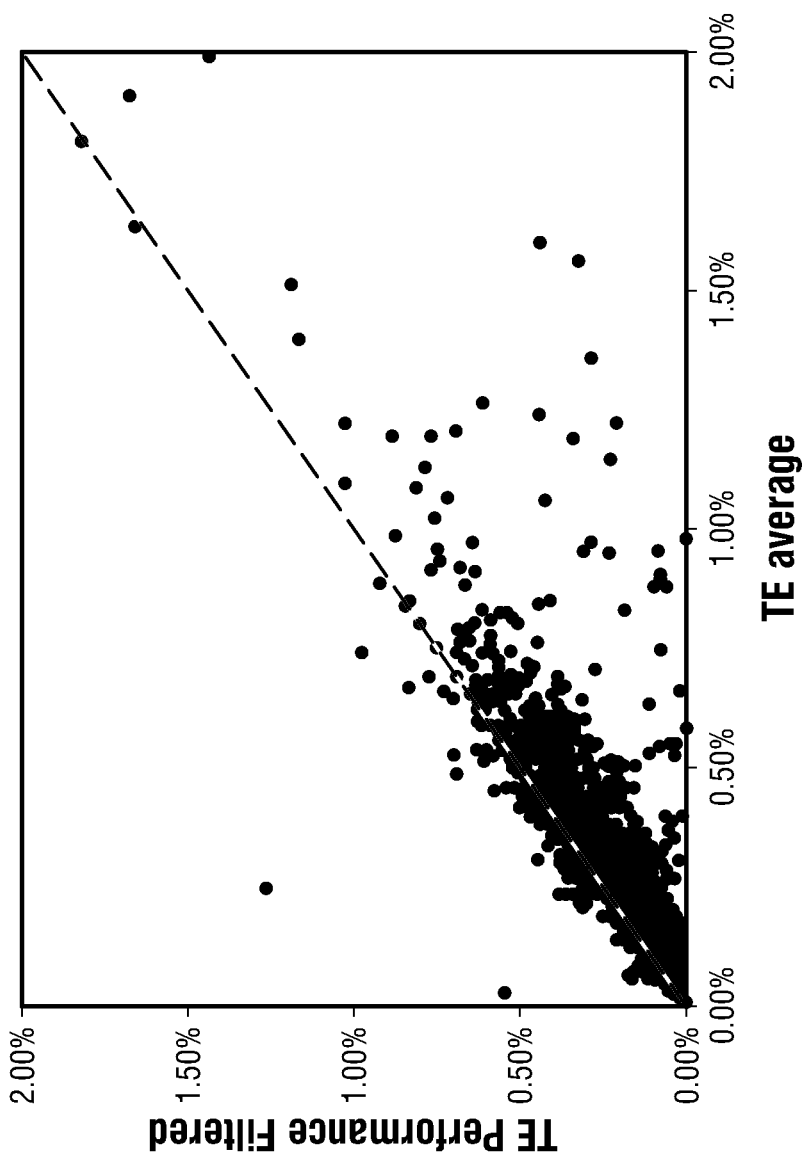
FIG. 16 depicts aspects of example data visualizations and calculations in accordance with an embodiment of the current disclosure.

FIG. 14 depicts aspects of a method 1400 for deriving closing reference prices. The method may include receiving a quote and trade data 1402. The method may include validating the quote and trade data 1404 and determining eligibility of the validated quote date based on eligibility criteria 1406. The validated quote and trade data may be filtered based on the eligibility criteria 1408. A performance filtered composite price may be determined based on the filtered quote and trade data 1410. FIG. 15 shows aspects of performance filtered composite price for example trade data determined using the methods described herein. The graphs in FIG. 15 show the relationship between the filtered composite price as a function of time, number of submitter contributions as a function of time and VWAP sell price. FIG. 15A shows that the performance filtered price is closer to the VWAP. FIG. 15B shows the number of contributors used for determining PFC price as a function of time. The number of eligible contributors may change due to filtering, holidays, and the like. FIG. 16 depicts aspects of similarity of tracking error and price volatility for sample data. The graph shows that the performance filtered price aligns with the average.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general-purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as; processor registers, cache memory, volatile memory, non-volatile memory; removable media such as flash memory (e.g., USB sticks or keys), standalone RAM disks, removable mass storage, off-line, and the like; other computer memory such as dynamic memory, static memory, read/write storage, mutable storage, read only, random access, sequential access, location addressable, file addressable, content addressable, network attached storage, storage area networks, and cloud storage.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, Python, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

The invention claimed is:

1. A method for processing and adjusting data records, the method comprising:
    electronically receiving, by a server, the data records from a plurality of sources distributed across one or more physical data storage elements for a plurality of submitters, wherein the data records include data fields;
    adjusting, using one or more processors of the server, the data records by adding fields to the data records, wherein the added fields provide normalized data and classification data for the data records;
    parsing, using the one or more processors of the server, at least a subset of the data fields and the added fields to identify a data window within the data records with at least a threshold of data for a subset of the plurality of submitters;
    generating, using the one or more processors of the server, data statistics of at least a subset of the data fields and the added fields for each submitter for the data window;
    appending, using the one or more processors of the server, flags to the data records according to the data statistics;
    automatically, using the one or more processors of the server, dropping data records according to the flags; and
    transmitting, over a computer network, an analysis of the data records that remain to a graphical user interface.

2. The method of claim 1, further comprising determining a performance filtered composite (PFC) price based on the flagged records.

3. The method of claim 2, further comprising determining eligibility criteria based on the data statistics for each data submitter.

4. The method of claim 3, wherein the eligibility criteria includes a measure of price volatility for each submitter.

5. The method of claim 4, further comprising removing records associated with submitters that do not meet the eligibility criteria.

6. The method of claim 5, further comprising:
    determining, from the data records, a tracking error threshold based on a tracking error and the price volatility; and
    removing data records based on the tracking error threshold.

7. The method of claim 1, wherein the data records include a sell data.

8. The method of claim 1, wherein the data records include a buy data.

9. The method of claim 1, wherein the data window corresponds to a time span between two and five days.

10. The method of claim 1, further comprising:
    displaying the data statistics for each submitter.

* * * * *

UNITED STATES PATENT AND TRADEMARK OFFICE
CERTIFICATE OF CORRECTION

| | |
|---|---|
| PATENT NO. | : 11,574,363 B2 |
| APPLICATION NO. | : 17/204382 |
| DATED | : February 7, 2023 |
| INVENTOR(S) | : Andre Craig et al. |

It is certified that error appears in the above-identified patent and that said Letters Patent is hereby corrected as shown below:

In the Drawings

Figure 12A:
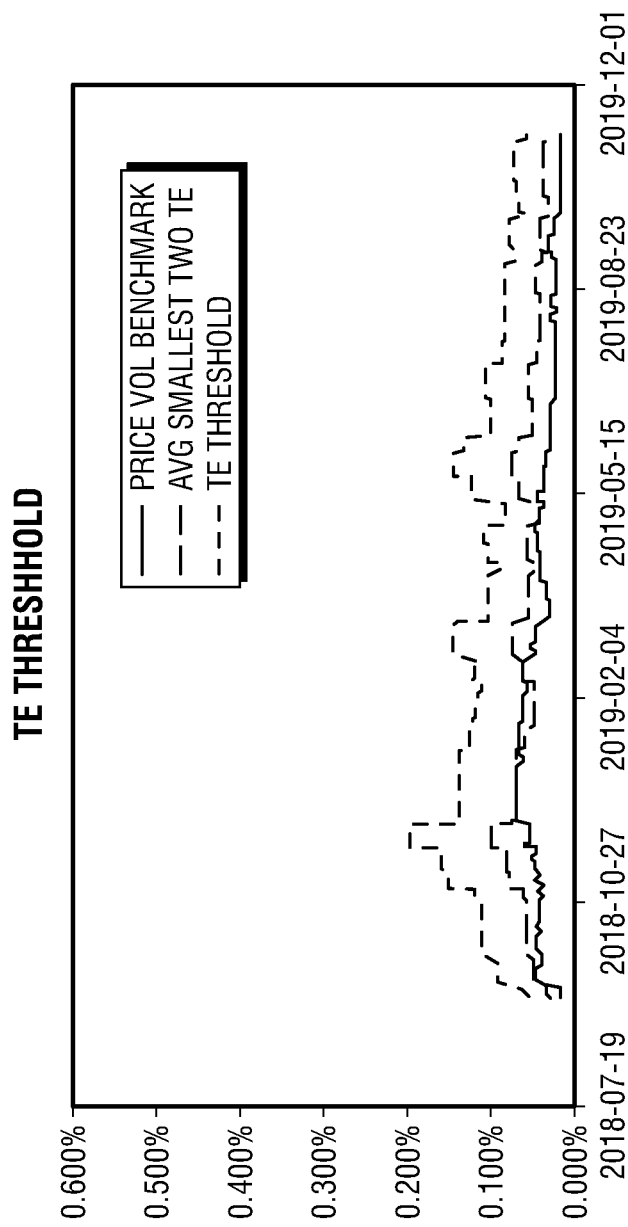
FIGS. 12A-12B depict aspects of example data visualizations and calculations in accordance with an embodiment of the current disclosure.
Figure 12B:
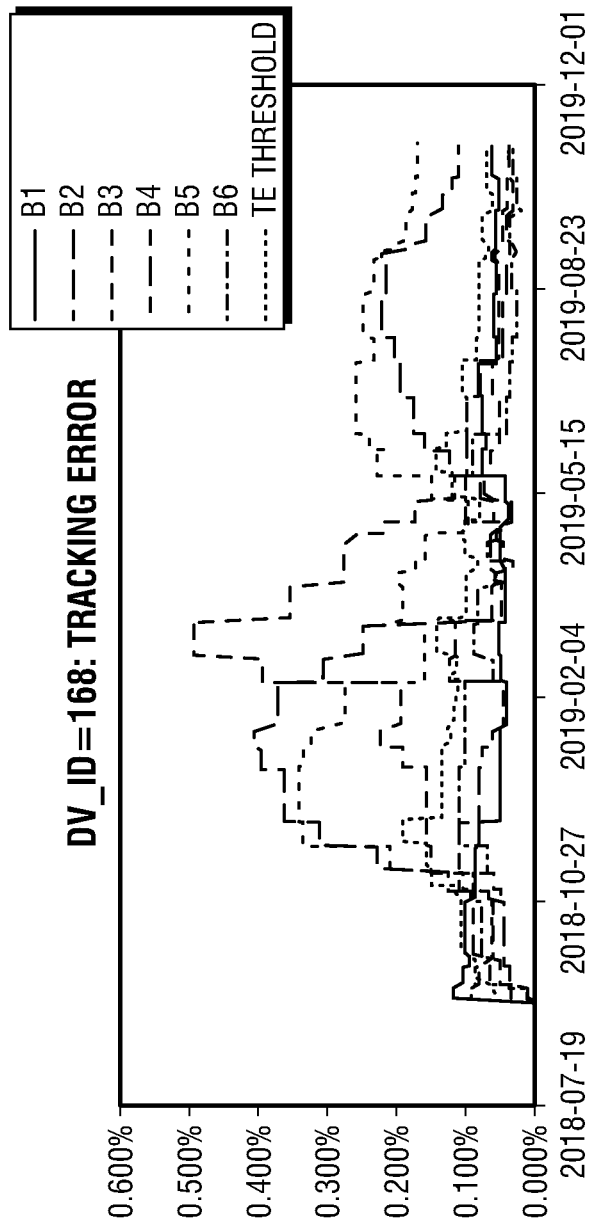
Figure 13A:
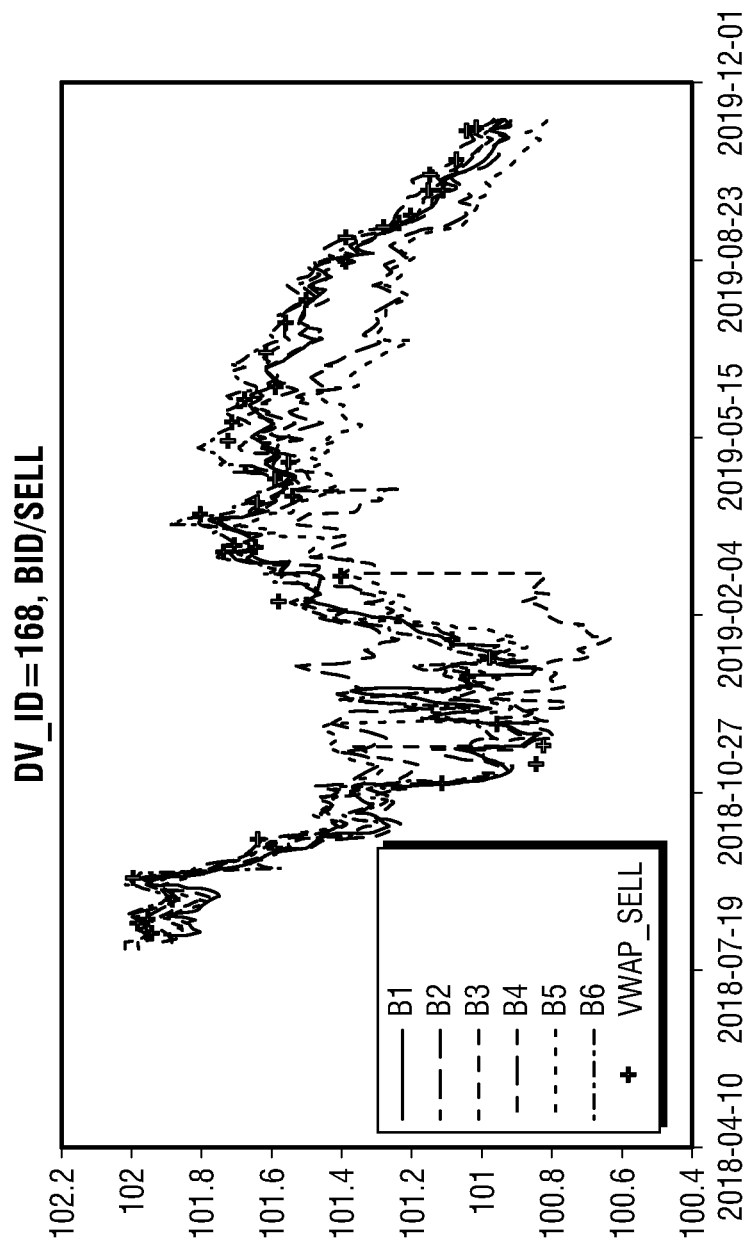
FIGS. 13A-13B depict aspects of example data visualizations and calculations in accordance with an embodiment of the current disclosure.
Figure 13B:
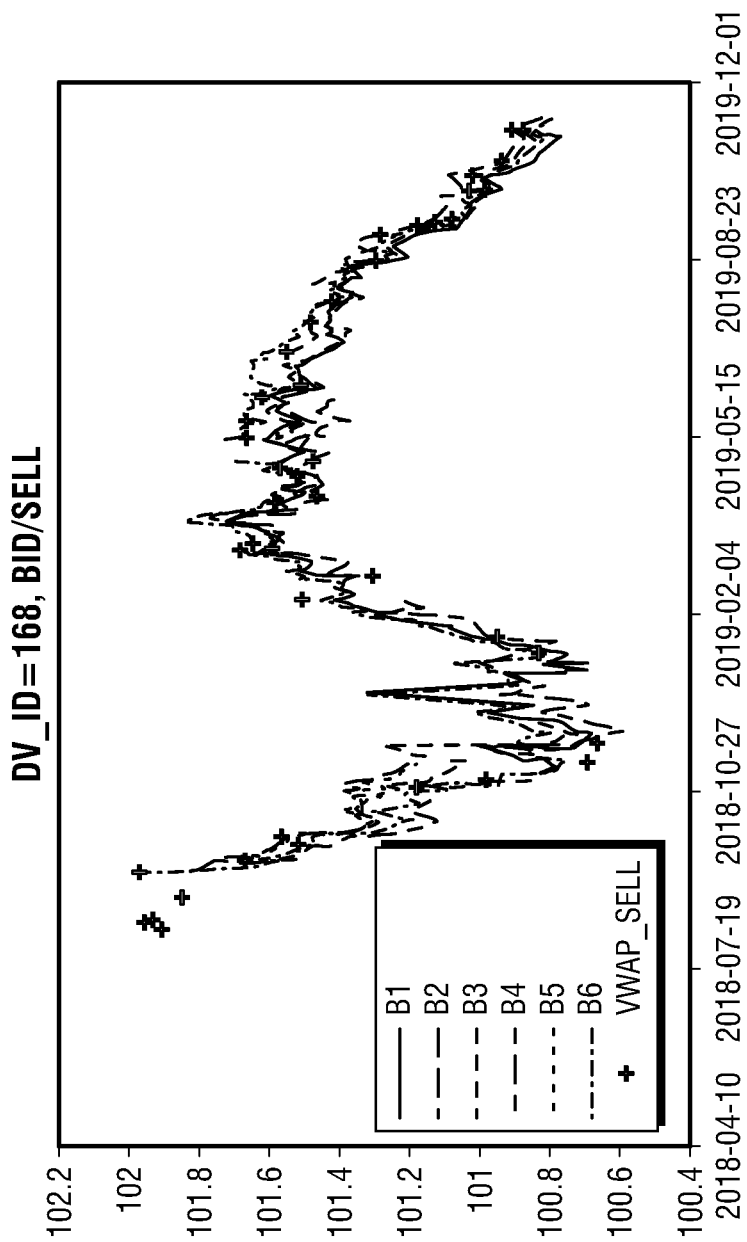

On sheet 14 of 21, in Figure 12A, Line 1, delete "THRESHHOLD" and insert -- THRESHOLD --.

On sheet 20 of 21, in Figure 15B, Line 1, delete "CONTRIBUTERS" and insert -- CONTRIBUTORS --.

In the Specification

In Column 3, Line 24, delete "FIG." and insert -- FIGS. --.

In Column 11, Line 5, delete "deliminators" and insert -- delimiters --.

In Column 11, Line 6, delete "deliminators" and insert -- delimiters --.

In Column 11, Lines 48-52, delete "One or more validations may cause a warning, while other validations may cause an error event. In embodiments, validation and data checks may include one or more of: security checks, yield change, Dixons Q tests, locked market tests, stale data tests, and the like." and insert the same on Column 11, Line 47, as continuation of the same paragraph.

In Column 15, Line 25, delete "B 1," and insert -- B1, --.

In Column 16, Lines 27-31, delete " $\frac{1}{2}\sum_{i=1}^{N} \frac{(R_i - \mu\, d_i)d_i}{\sigma^4 d_i} - \frac{N}{2\sigma^2} = 0$ " and insert -- $\frac{1}{2}\sum_{i=1}^{N} \frac{(R_i - \mu\, d_i)^2}{\sigma^4 d_i} - \frac{N}{2\sigma^2} = 0$ --.

Signed and Sealed this
Sixth Day of June, 2023

*Katherine Kelly Vidal*
Katherine Kelly Vidal
*Director of the United States Patent and Trademark Office*

CERTIFICATE OF CORRECTION (continued)
U.S. Pat. No. 11,574,363 B2

In Column 16, Lines 41-42, delete "$\sigma=\sqrt{\mu_2-d\mu^2}$," and insert -- $\sigma = \sqrt{\mu_2 - d\,\mu^2}$ --.

In Column 19, Line 46, delete "days.)." and insert -- days). --.

In Column 23, Line 47, delete "chanage" and insert -- change --.